(12) United States Patent
Siddiqui et al.

(10) Patent No.: US 11,599,155 B2
(45) Date of Patent: Mar. 7, 2023

(54) HINGED DEVICE

(71) Applicant: Microsoft Technology Licensing, LLC, Redmond, WA (US)

(72) Inventors: Kabir Siddiqui, Sammamish, WA (US); Daniel C. Park, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/913,798

(22) Filed: Jun. 26, 2020

(65) Prior Publication Data

US 2021/0325937 A1 Oct. 21, 2021

Related U.S. Application Data

(60) Provisional application No. 63/013,191, filed on Apr. 21, 2020.

(51) Int. Cl.
| | | |
|---|---|---|
| *G06F 1/16* | (2006.01) | |
| *E05D 3/12* | (2006.01) | |
| *H04M 1/02* | (2006.01) | |

(52) U.S. Cl.
CPC .......... *G06F 1/1681* (2013.01); *E05D 3/122* (2013.01); *E05Y 2900/606* (2013.01); *H04M 1/022* (2013.01)

(58) Field of Classification Search
CPC . G06F 1/1681; E05D 3/122; E05Y 2900/606; H04M 1/22
See application file for complete search history.

(56) References Cited

U.S. PATENT DOCUMENTS

| | | | | |
|---|---|---|---|---|
| 10,401,914 B2* | 9/2019 | Shang | ...................... | E05D 5/04 |
| 10,558,245 B2* | 2/2020 | Morrison | .............. | G06F 1/1618 |
| 10,563,438 B1* | 2/2020 | Chen | ...................... | G06F 1/1681 |
| 10,664,021 B1* | 5/2020 | Hsu | ...................... | H04B 1/3888 |
| 10,761,572 B1* | 9/2020 | Siddiqui | .............. | G06F 1/1681 |
| 10,931,070 B1* | 2/2021 | Files | ...................... | H01R 9/0524 |
| 2009/0070961 A1* | 3/2009 | Chung | .................. | E05D 3/122 16/354 |
| 2011/0157780 A1* | 6/2011 | Wang | .................... | G06F 1/1681 361/679.01 |
| 2012/0096678 A1* | 4/2012 | Zhang | .................. | G06F 1/1681 16/302 |
| 2017/0275935 A1* | 9/2017 | Shang | ...................... | E05D 3/12 |

(Continued)

FOREIGN PATENT DOCUMENTS

WO   2019045709 A1   3/2019

OTHER PUBLICATIONS

"International Search Report and Written Opinion Issued in PCT Application No. PCT/US21/019141", dated Jun. 1, 2021, 12 Pages.

*Primary Examiner* — Victor D Batson
*Assistant Examiner* — Matthew J Sullivan
(74) *Attorney, Agent, or Firm* — Rainier Patents, P.S.

(57) ABSTRACT

The description relates to hinged devices, such as hinged computing devices. One example can include a first portion that is secured to a hinge assembly by a first primary hinge shaft and a first secondary hinge shaft that is not co-extensive with the first primary hinge shaft. The example can also include a second portion that is secured to the hinge assembly by a second primary hinge shaft and a second secondary hinge shaft that is not co-extensive with the second primary hinge shaft.

18 Claims, 20 Drawing Sheets

(56) References Cited

U.S. PATENT DOCUMENTS

| | | | |
|---|---|---|---|
| 2018/0356858 A1 | 12/2018 | Siddiqui et al. | |
| 2019/0278338 A1 | 9/2019 | Siddiqui | |
| 2019/0301215 A1* | 10/2019 | Siddiqui | E05D 3/18 |
| 2020/0081501 A1* | 3/2020 | Lin | G06F 1/1681 |
| 2020/0103935 A1* | 4/2020 | Hsu | G06F 1/1681 |
| 2020/0174531 A1* | 6/2020 | Lin | E05D 3/122 |
| 2020/0218315 A1* | 7/2020 | Huang | G06F 1/1637 |
| 2020/0267244 A1* | 8/2020 | Kim | H04M 1/0268 |
| 2020/0267856 A1* | 8/2020 | Hsu | H05K 5/0017 |
| 2021/0081007 A1* | 3/2021 | Jan | G06F 1/1681 |
| 2021/0103317 A1* | 4/2021 | Raju | G06F 1/203 |
| 2021/0149454 A1* | 5/2021 | Liu | F16C 11/04 |
| 2021/0207414 A1* | 7/2021 | Wong | E05D 3/186 |
| 2021/0240231 A1* | 8/2021 | Ku | G06F 1/1618 |
| 2021/0267076 A1* | 8/2021 | Zhang | H05K 5/0226 |
| 2021/0286413 A1* | 9/2021 | Chen | H04M 1/022 |
| 2021/0318723 A1* | 10/2021 | Cheng | G06F 1/1637 |
| 2021/0325927 A1* | 10/2021 | Hsu | G06F 1/1681 |
| 2021/0333838 A1* | 10/2021 | Song | G06F 1/1681 |

\* cited by examiner

HINGED DEVICE

PRIORITY

This application is a utility application that claims priority from U.S. Provisional Application 63/013,191, filed Apr. 21, 2020, which is hereby incorporated by reference in its entirety.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

DESCRIPTION

The present concepts relate to devices, such as computing devices employing hinge assemblies that can rotationally secure first and second device portions relative to hinge axes. For instance, in some cases a first primary hinge axis (PHA) relates to the first portion and a second primary hinge axis relates to the second portion. The present concepts can provide a definable and consistent resistance to rotation around the hinge axes. This resistance to rotation can ensure that the device maintains an orientation selected by the user. The resistance to rotation can be provided by secondary hinge shafts that define secondary hinge axes (SHA). The resistance to rotation can be conveyed from the secondary hinge shafts to primary hinge shafts that lie along the first and second hinge axes. This configuration can allow displays to cover more of the first and second portions than was possible in previous solutions, among other advantages.

Figure 1:
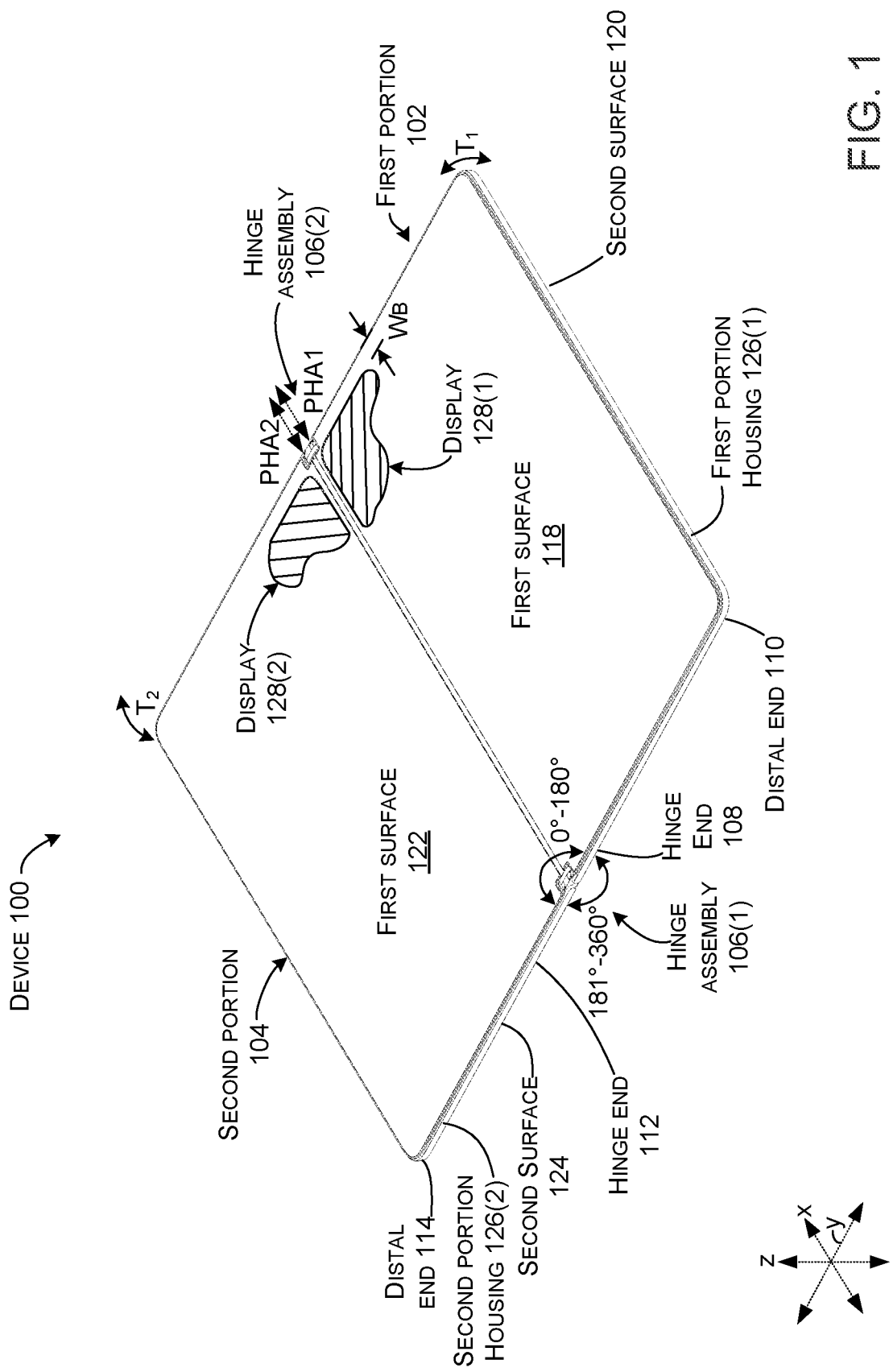
FIGS. 1, 2A, 2B, 3A, 4A, 4B, 5A, 5F, 5G, 6A, 6B, 7A, and 7B show perspective views of example devices in accordance with some implementations of the present concepts.

Introductory FIG. 1 shows an example device 100 that has first and second portions 102 and 104 that are rotatably secured together by hinge assemblies 106. In the illustrated implementation, two hinge assemblies 106(1) and 106(2) are employed (e.g., one near each end (outer edges) of the device), but other implementations could employ a single hinge assembly or more than two hinge assemblies. In the illustrated configuration, the hinge assemblies 106 can define a center of the device from which the first and second portions extend.

The first portion 102 can extend from a hinge end 108 to a distal end 110. The second portion 104 also can extend from a hinge end 112 to a distal end 114. In this example, the hinge assemblies 106 can define two primary hinge axes (PHA1 and PHA2). The first portion 102 can rotate around first primary hinge axis PHA1 and the second portion 104 can rotate around second primary hinge axis PHA2.

Hinge assemblies 106 can define a resistance to rotation relative to the first primary hinge axis PHA1 and the second primary hinge axis PHA2. Stated another way, the hinge assemblies 106 can define an amount of torque ($T_1$) required to overcome the resistance to rotation and rotate the first portion 102 around the first primary axis PHA1 and/or the amount of torque ($T_2$) required to overcome the resistance to rotation and rotate the second portion 104 around the second primary hinge axis PHA2.

The first portion 102 can include opposing first and second major surfaces 118 and 120 (hereinafter, first and second surfaces). Similarly, the second portion 104 can include opposing first and second major surfaces 122 and 124 (hereinafter, first and second surfaces). (Note that the second surfaces 120 and 124 are facing away from the viewer and as such are not directly visible in this view.)

In some implementations, the first portion 102 can include a first housing (e.g., first portion housing 126(1)) and the second portion 104 can include a second housing (e.g., second portion housing 126(2)). In the illustrated example, a display 128(1) is positioned on first portion housing 126(1) and display 128(2) is positioned on second portion housing 126(2). In this case, the displays 128 are positioned on the first surfaces 118 and 122, respectively. In other examples, the displays 128 can be positioned on the first and/or second surfaces 118, 120, 122, and/or 124, respectively. In still other examples other types of accessories or input devices can be employed. For example, other types of accessories or input devices can entail keypads, keyboards, game controllers, and/or trackpads, among others. For instance, a display could be employed on first surface 118 and a keyboard could be employed on first surface 122.

In some configurations, the displays 128 do not overlay the hinge assemblies 106 in the x-reference direction. The present hinge assemblies 106 can be narrower (e.g., have less width in the x-reference direction) and/or can be thin enough to allow the displays to overlay portions of the hinge assemblies 106. As such, the device can have a narrower bezel width (WB) than previous hinge designs. This can allow the displays to occupy a higher percentage of the major surfaces than existing designs.

Figure 2A:
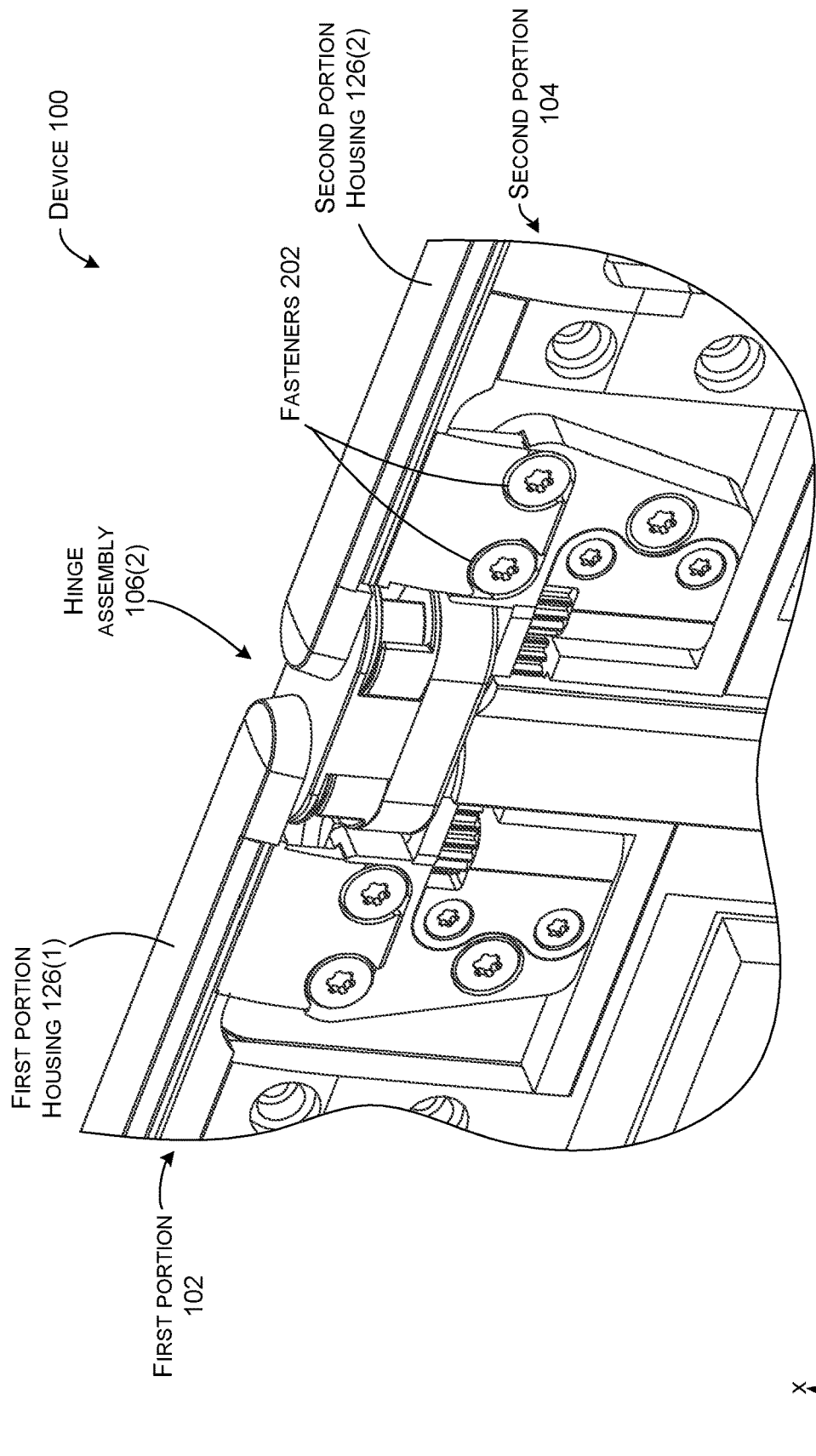
Figure 2B:
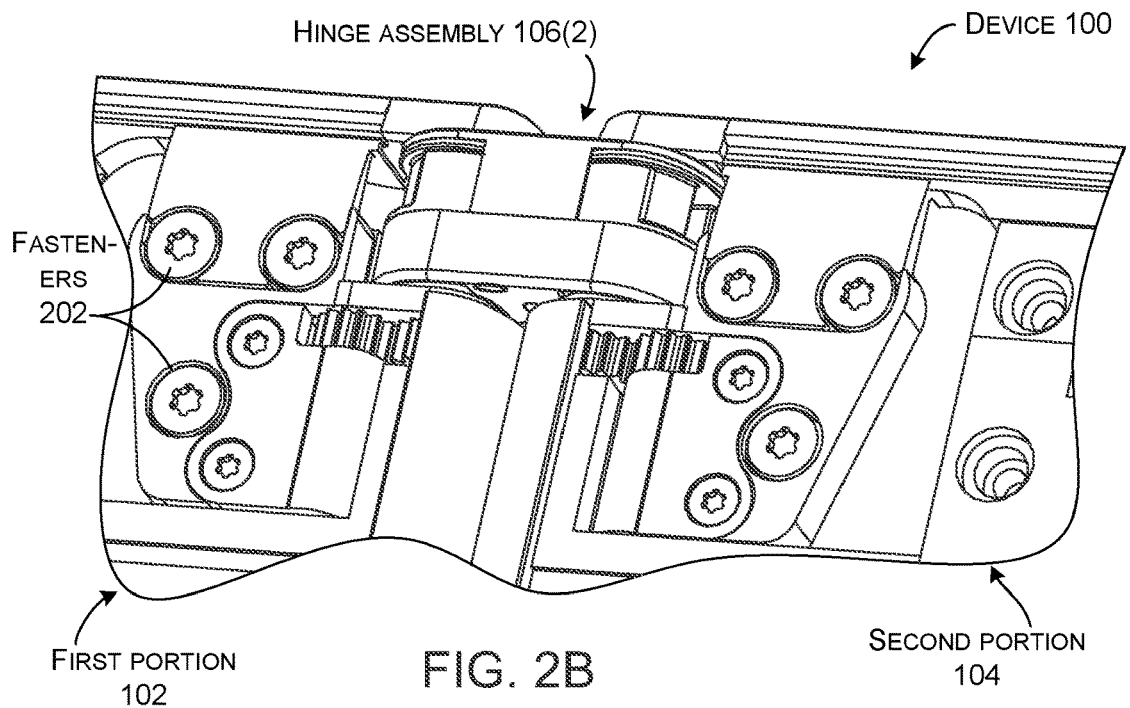
Figure 2C:
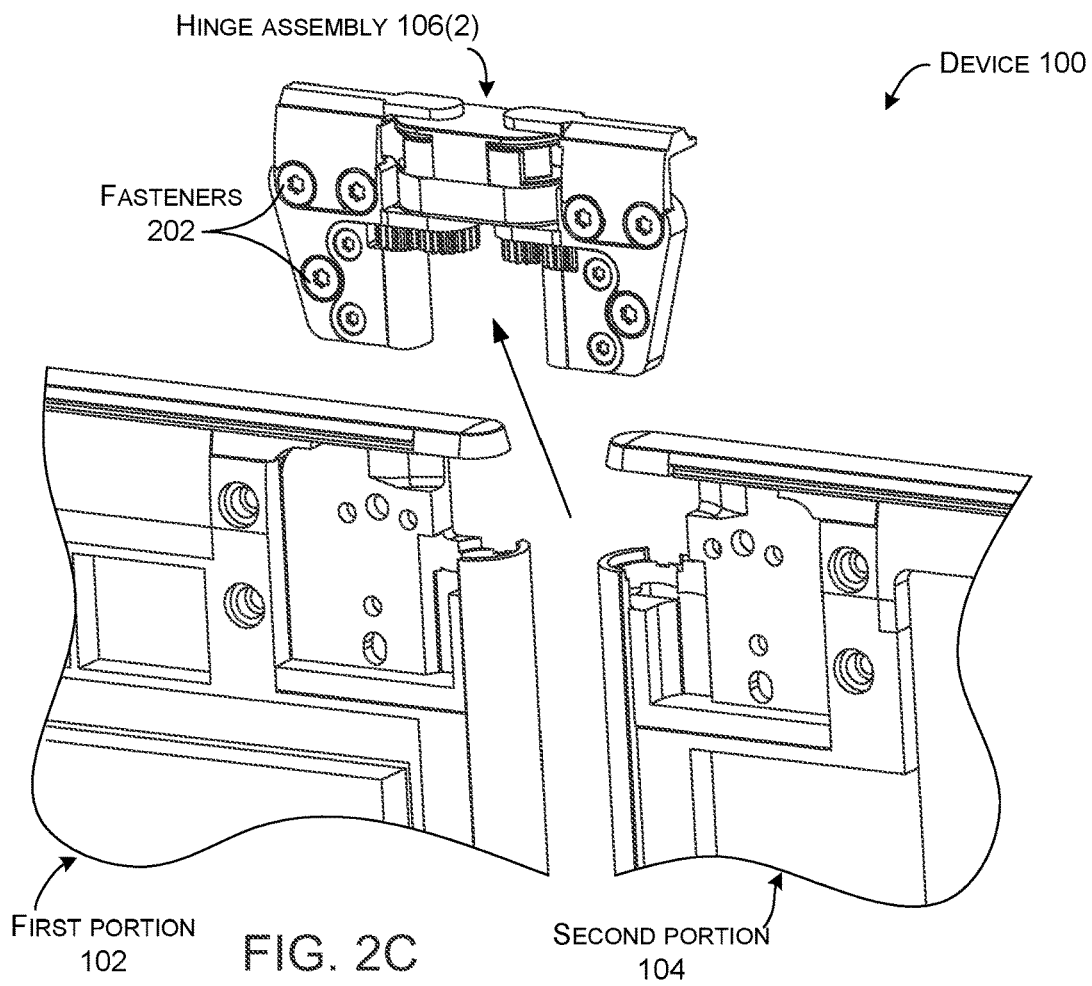
FIGS. 2C, 3B-3E, 4C, 4D, 5B, 6C, and 7C show exploded perspective views of example devices in accordance with some implementations of the present concepts.

FIGS. 2A-2C collectively show enlarged views of a portion of device 100 that includes hinge assembly 106(2). FIGS. 2A and 2B show an assembled device 100 where the hinge assembly 106(2) is secured to the first and second portions 102 and 104 by fasteners 202 (not all of which are labelled). FIG. 2C shows the hinge assembly 106(2) removed from the device.

Figure 3A:
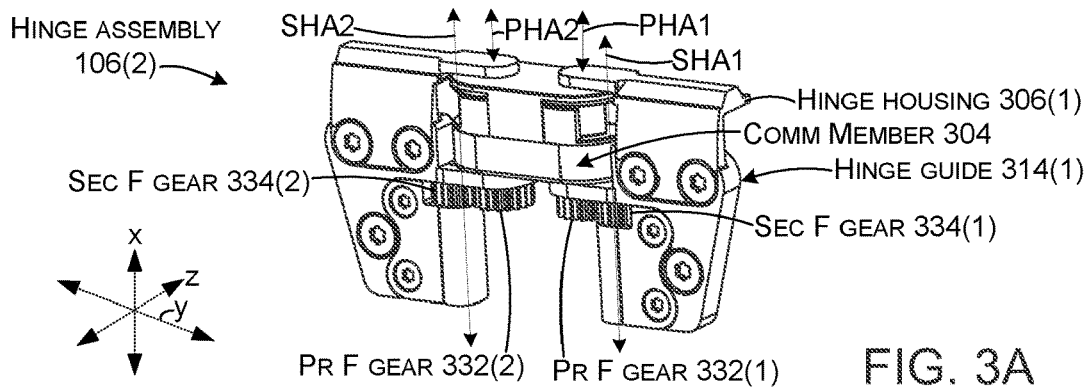
Figure 3B:
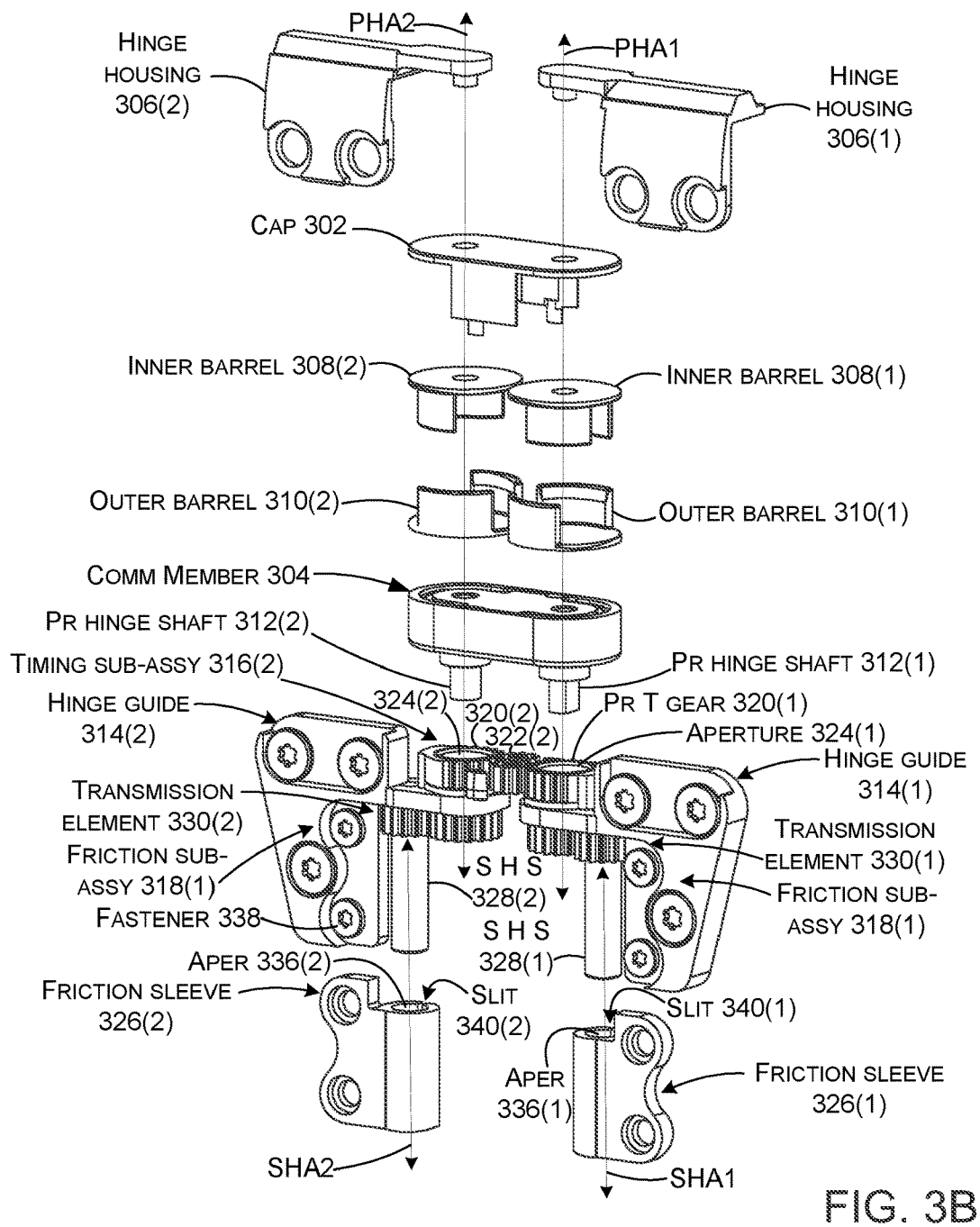
Figure 3C:
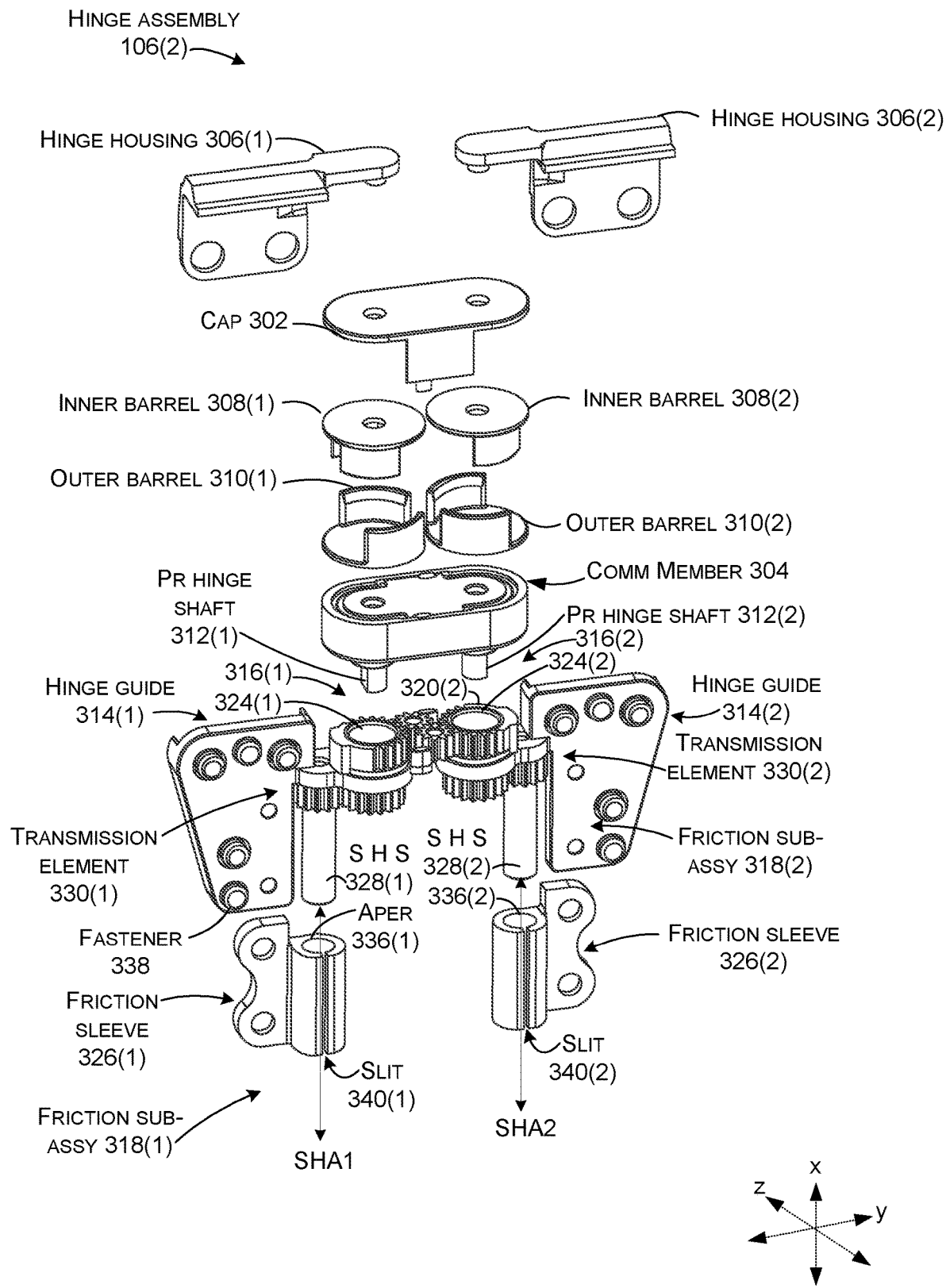
Figure 3D:
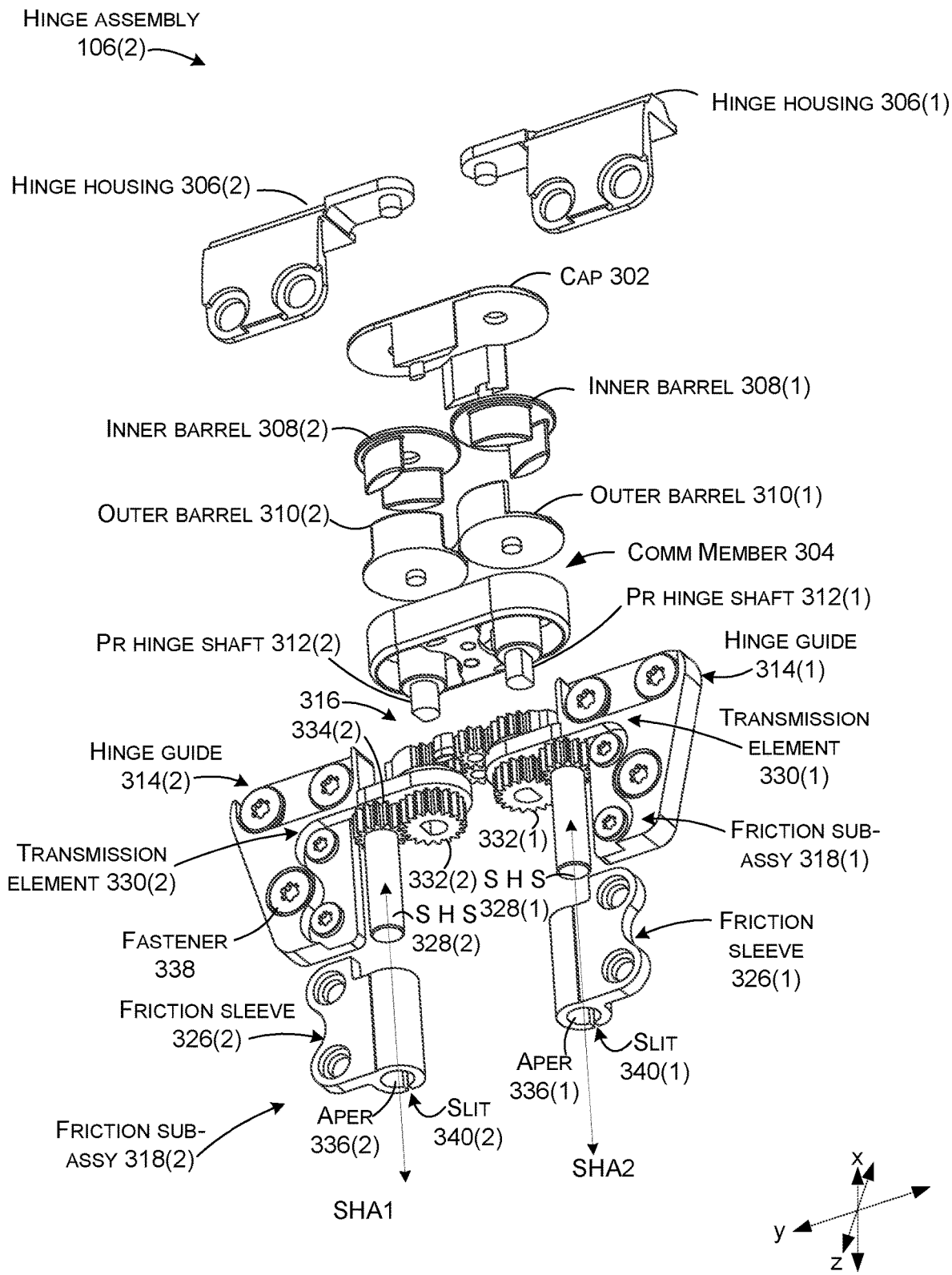
Figure 3E:
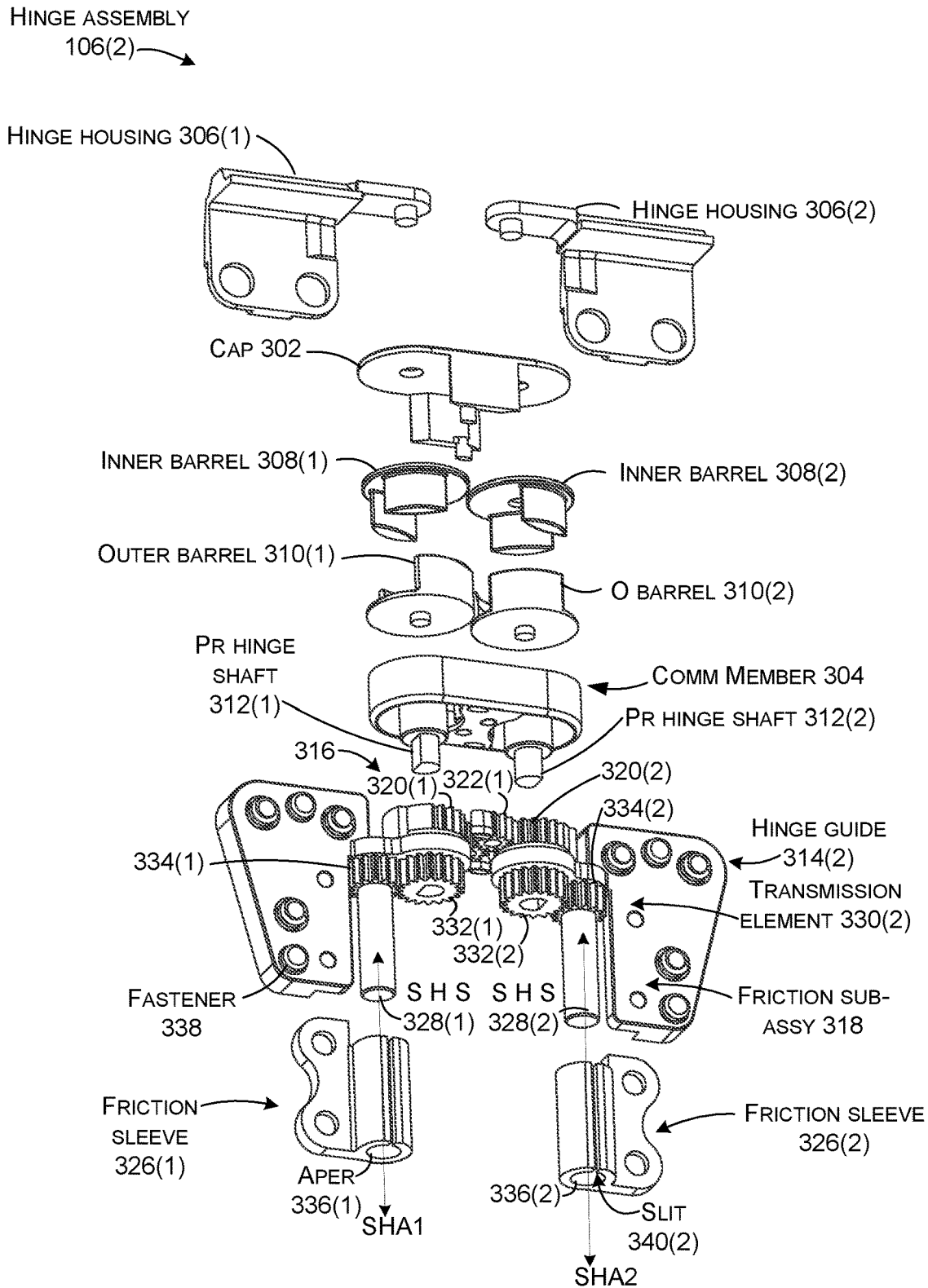

FIGS. 3A-3G show details of example hinge assembly 106(2). FIG. 3A shows the hinge assembly and FIG. 3B shows a similar exploded view of the hinge assembly 106(2).

The hinge assembly 106(2) can include a cap 302 and a communication member 304. The hinge assembly can also include hinge housings 306, inner barrels 308, and outer barrels 310. The communication member 304 can define primary hinge shafts 312 (labeled on FIG. 3B). The hinge assembly can also include hinge guides 314, a timing sub-assembly 316 and a friction sub-assembly 318. In this case, the timing sub-assembly 316 can include primary timing gears 320 and secondary timing gears 322. Primary timing gears 320 can be fixed to the hinges guides 314. Apertures 324 formed through the primary timing gears 320 can receive the primary hinge shafts 312.

The friction sub-assembly 318 can include friction sleeves 326, secondary hinge shafts 328, and a transmission element 330. In this case, the transmission element 330 is manifest as primary friction gears 332 (labeled FIG. 3A) that are co-extensive with the primary hinge axes (PHA) (e.g., primary hinge shafts 312) and secondary friction gears 334 (labeled FIG. 3A) that are co-extensive with the secondary hinge axes (SHA) (e.g., secondary hinge shafts 328). The primary friction gears 332 can be fixed relative to the communication member 304. The friction sleeves 326 can define apertures 336 that receive the secondary hinge shafts 328.

Figure 4A:
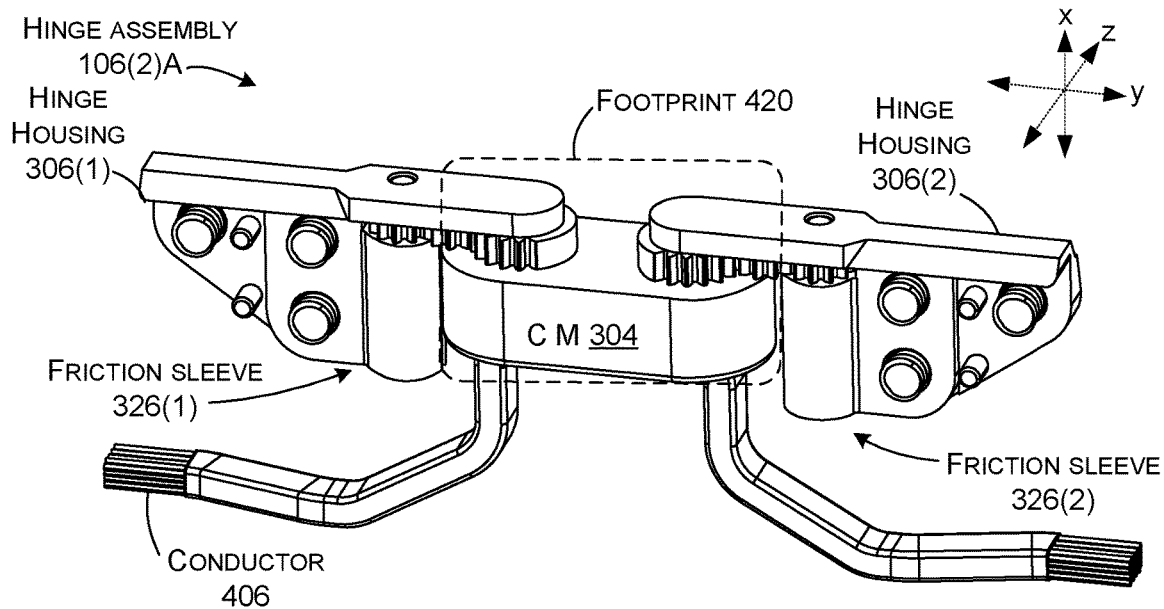
Figure 4B:
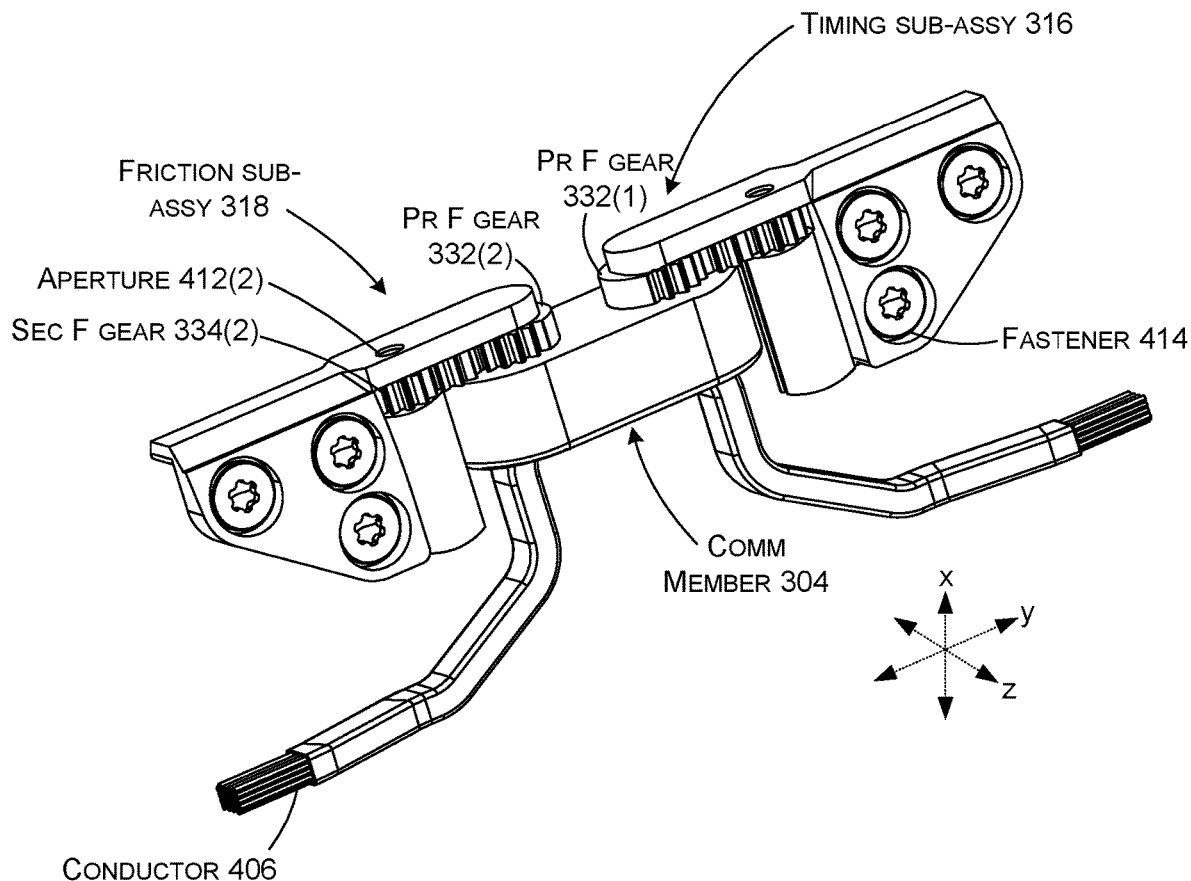
Figure 4C:
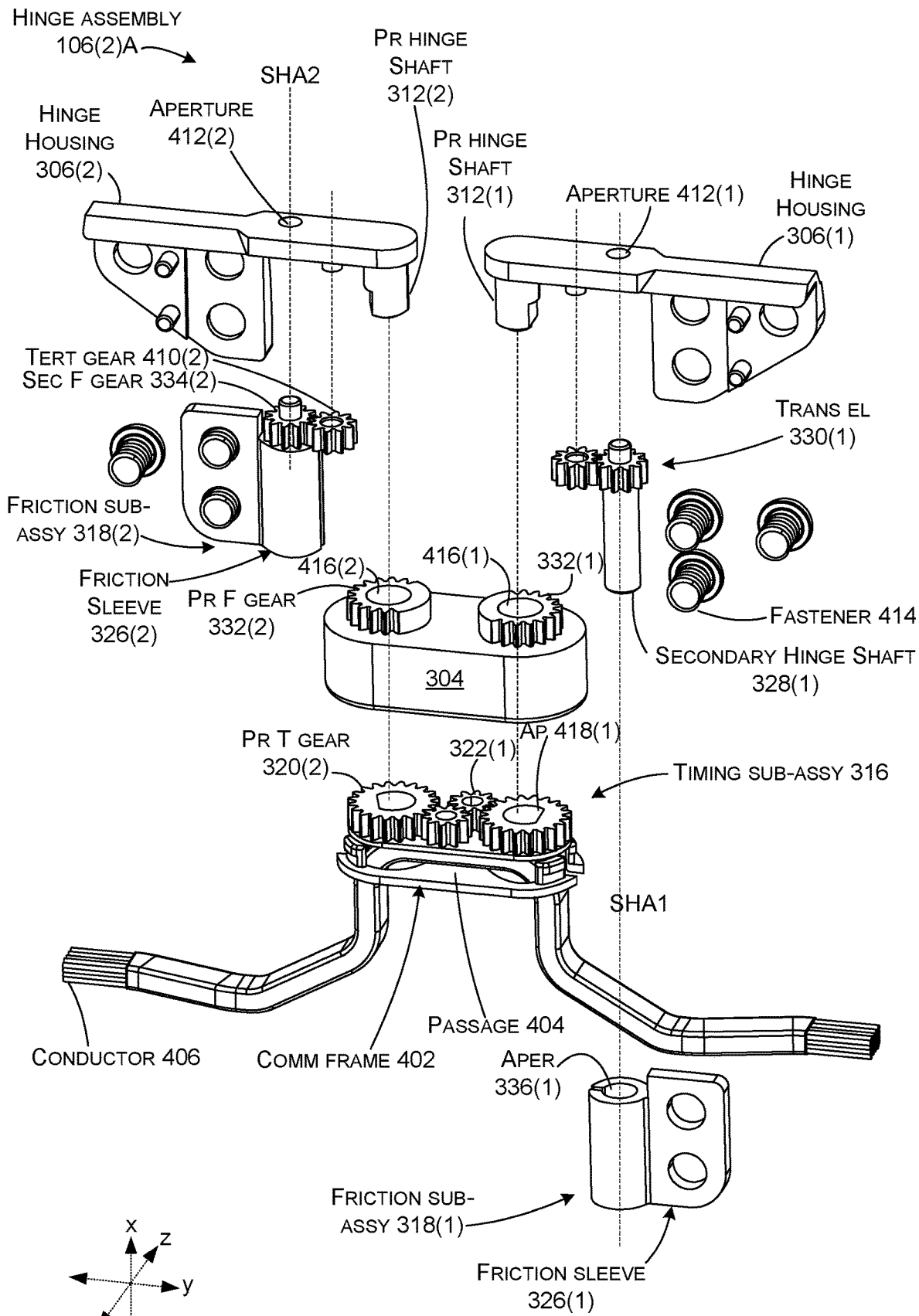
Figure 4D:
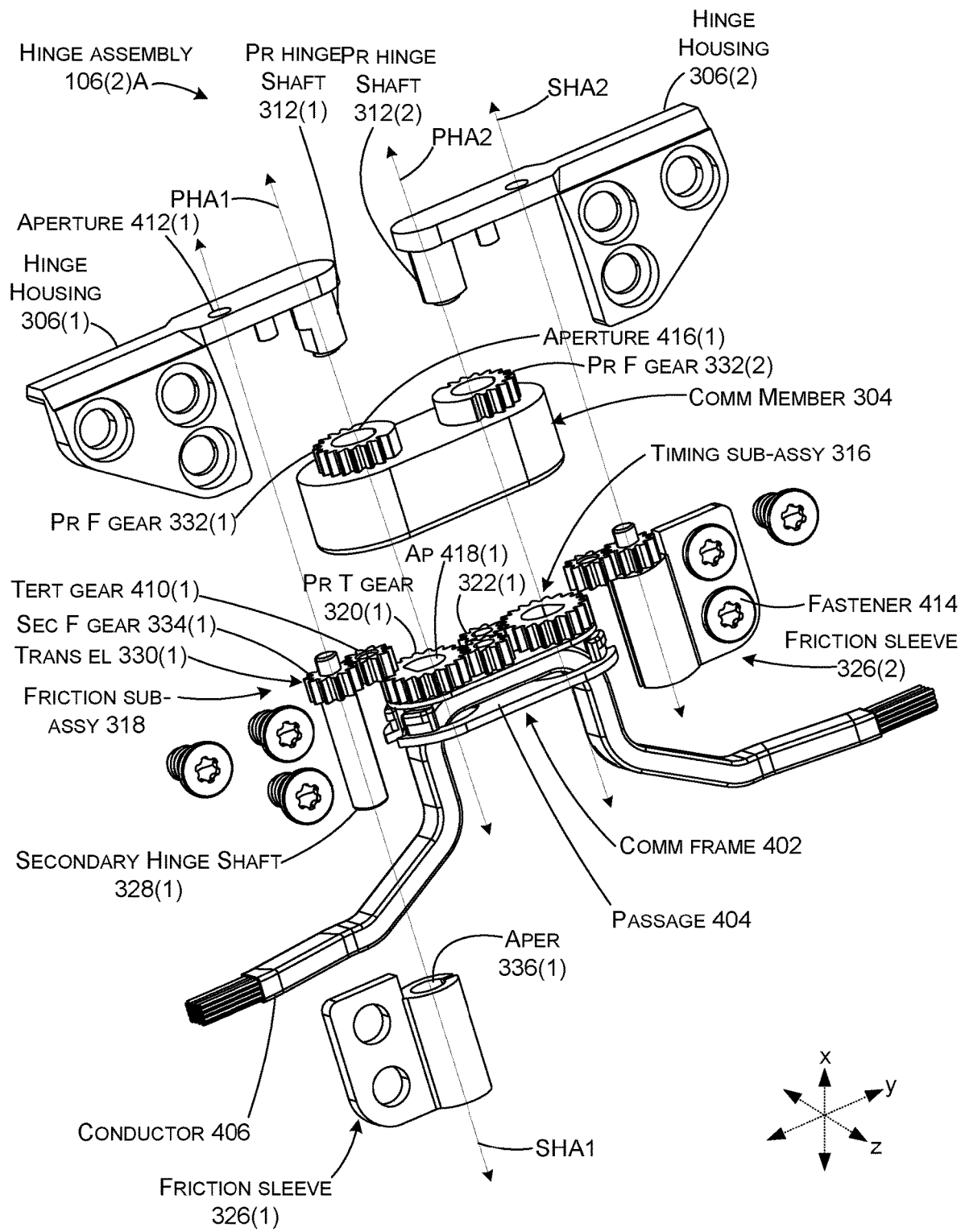
Figure 5A:
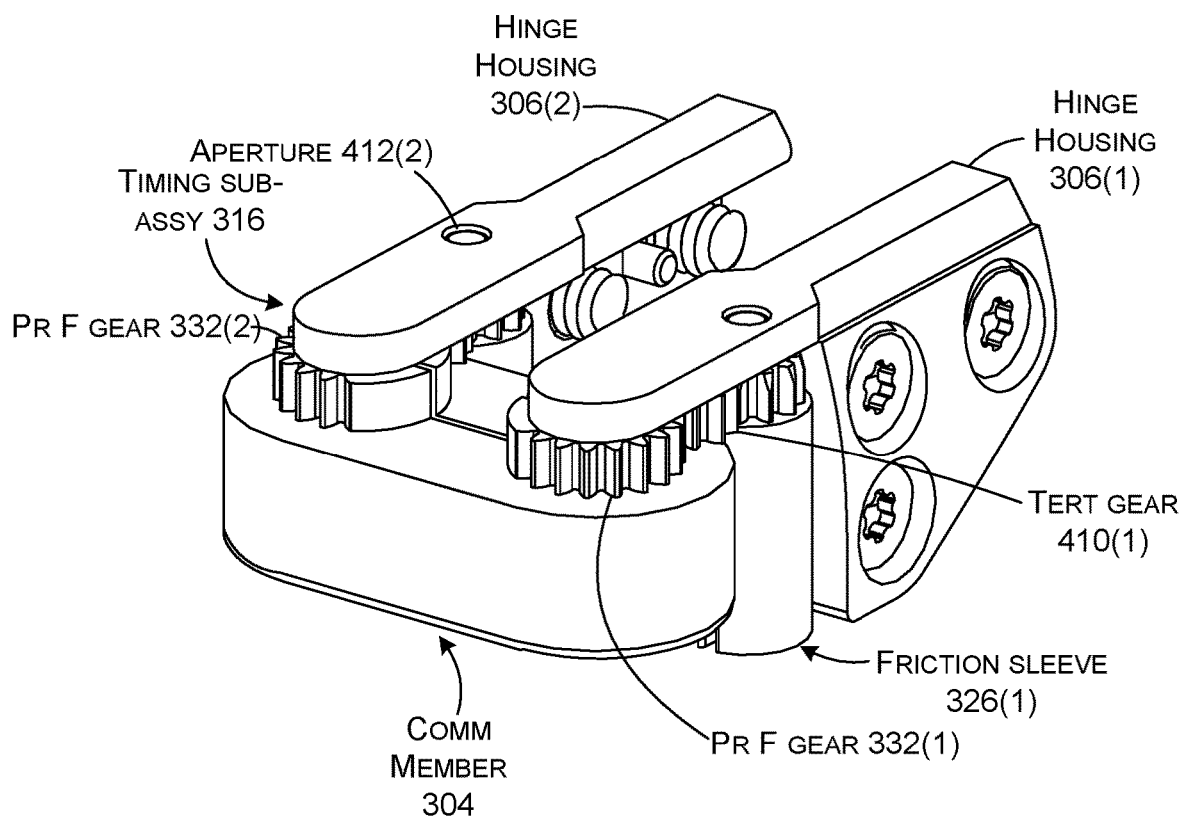
Figure 5B:
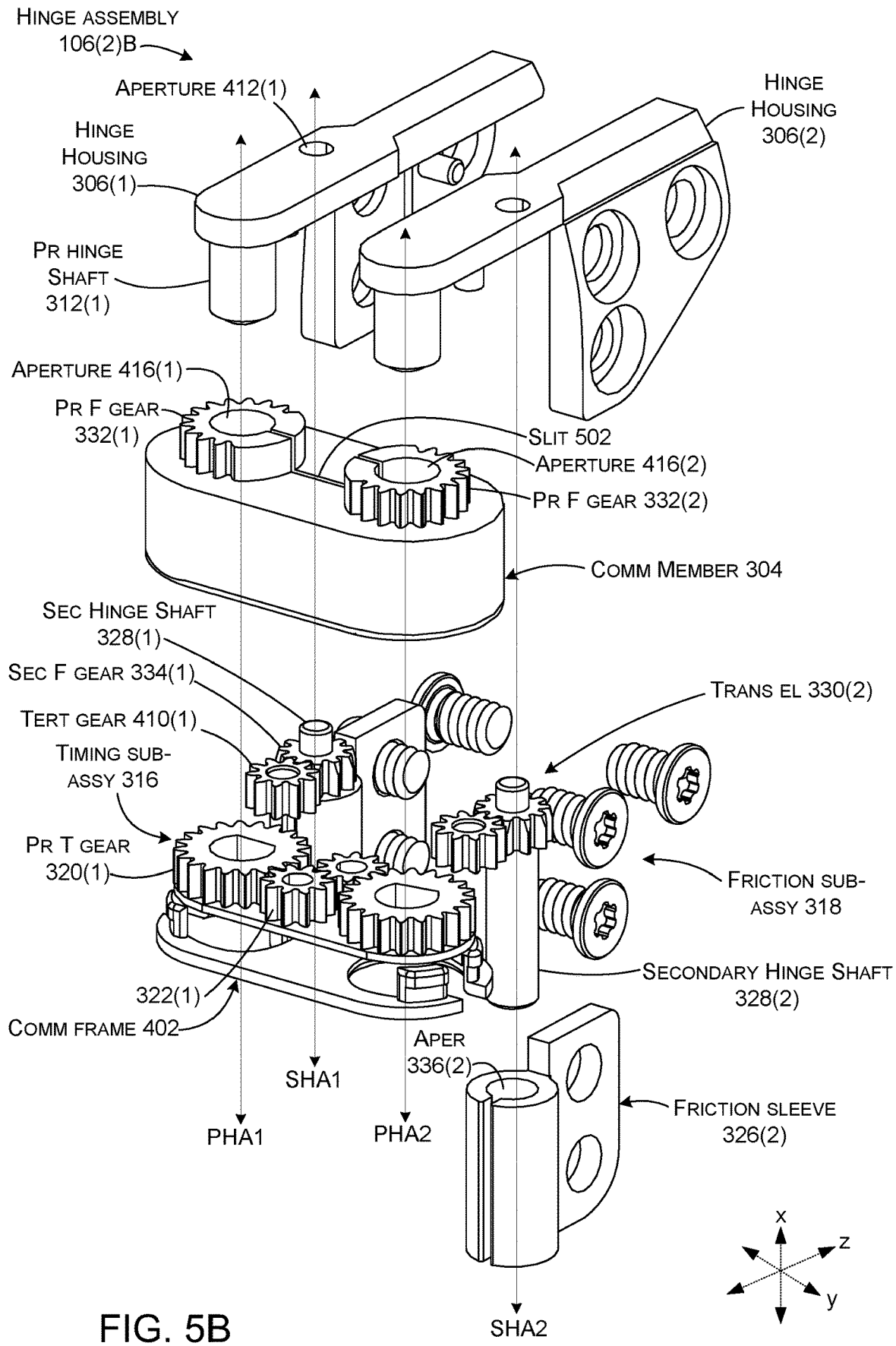
Figure 5C:
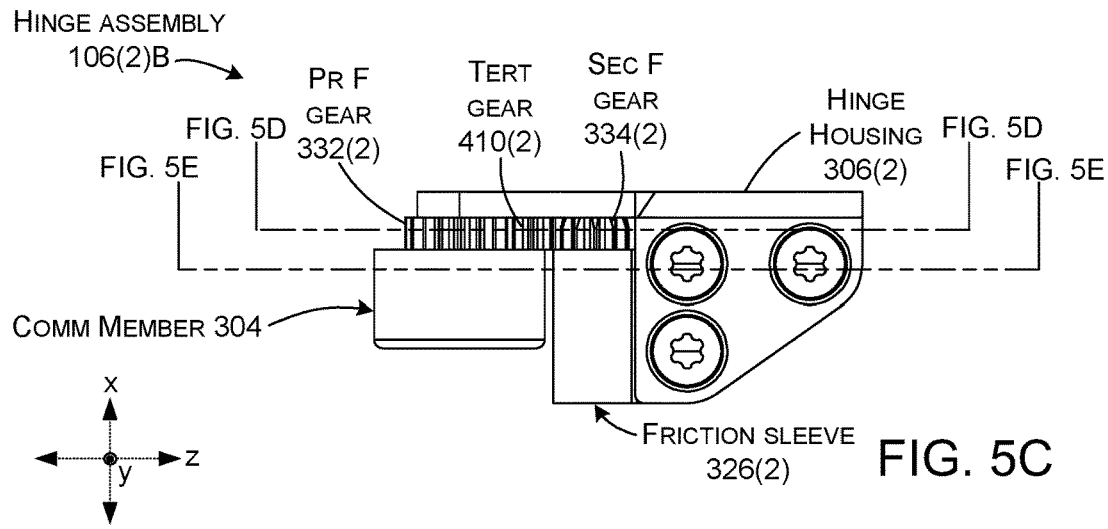
FIGS. 5C and 8-10 show elevational views of example devices in accordance with some implementations of the present concepts.
Figure 5D:
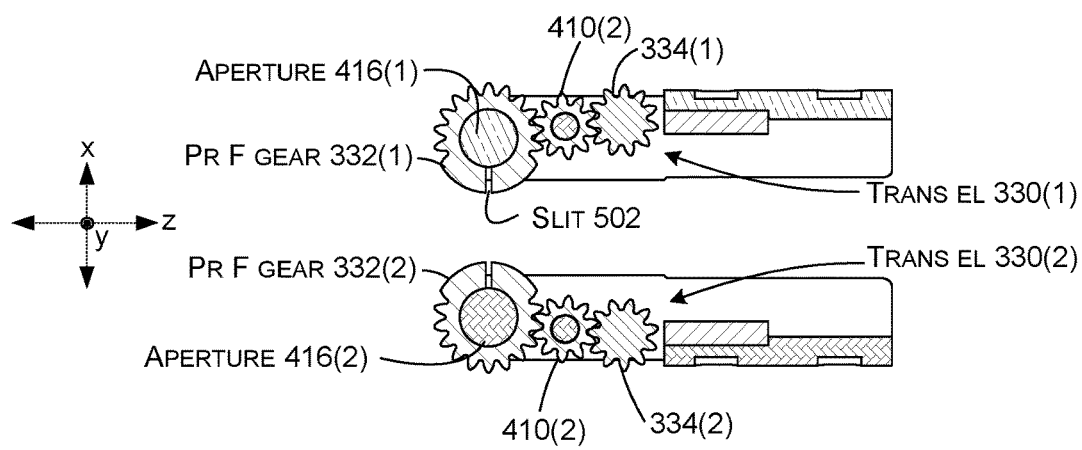
FIGS. 5D and 5E show sectional views of the example device of FIG. 5C in accordance with some implementations of the present concepts.
Figure 5E:
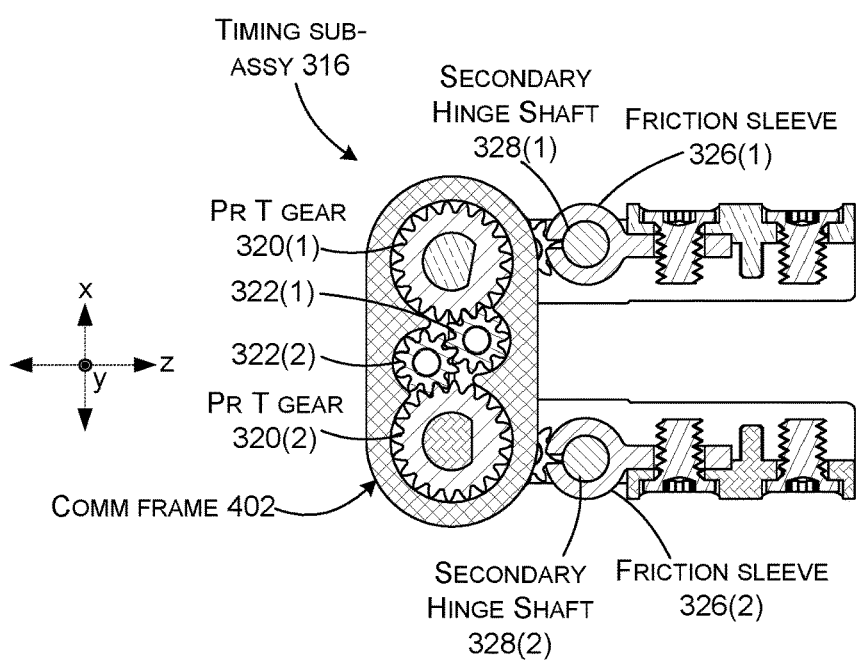
Figure 5F:
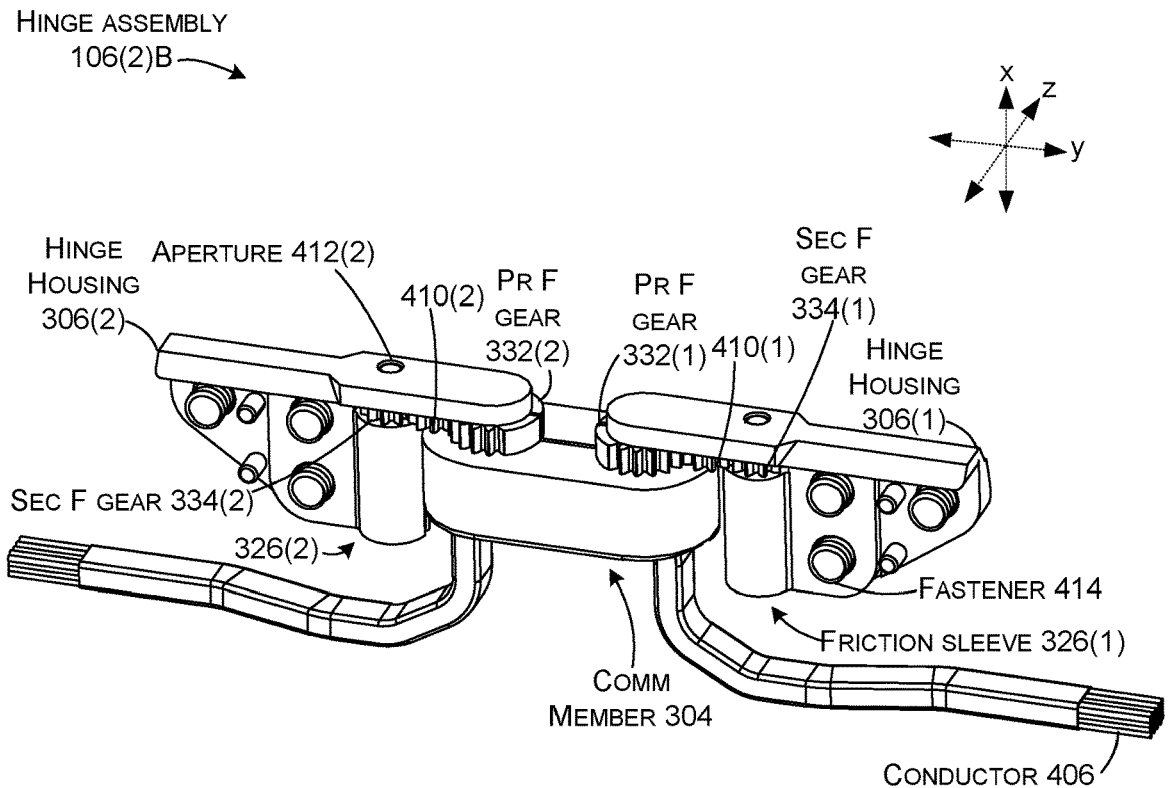
Figure 5G:
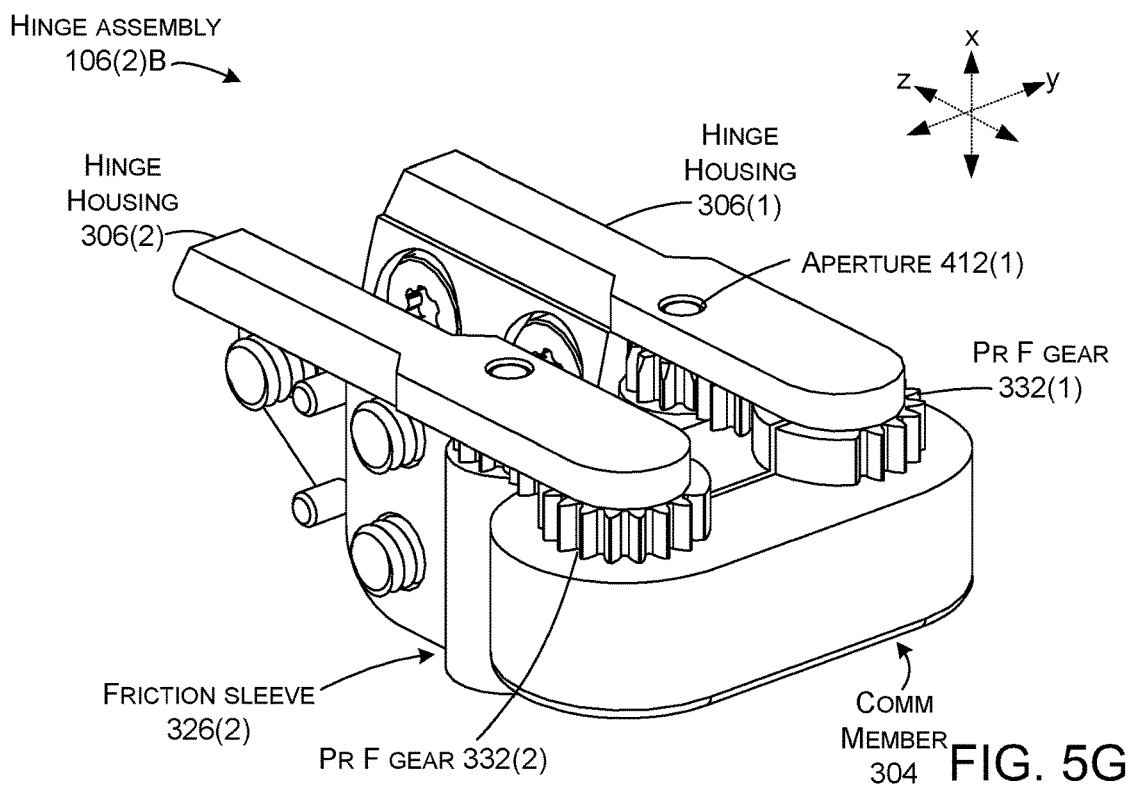

The communication member 304 can receive nested inner and outer barrels 308 and 310 in a rotational relation (e.g., the inner and outer barrels are secured relative to the communication member and can rotate around the hinge axes (HA). A conductor (not shown here, but shown and discussed below relative to FIGS. 4A-4C), such as traditional insulated wire(s) and/or a flexible printed circuit(s) (FPC) can pass from first portion 102 through the inner and outer barrels 308 and 310 and to the second portion 104. The inner and outer barrels 308 and 310 can protect the conductor from damage when the first and second portions are rotated relative to one another. The conductor can be retained by cap 302, which secures to the communication member 304 over the inner barrels 308, and outer barrels 310. An alternative configuration for passing conductors through the hinge assembly is described below relative to FIGS. 4A-4D.

The communication member 304 can define parallel primary hinge shafts 312. The primary hinge shafts 312 can be fixed in non-rotating relation to one another. The primary hinge shafts 312 can be co-extensive with the primary hinge axes.

The timing sub-assembly 316 can synchronize rotation (e.g., extent of rotation) of the first and second portions 102 and 104 around the primary hinge axes. For instance, the timing sub-assembly 316 can ensure that 20 degrees of rotation around the first primary hinge axis simultaneously produces an equal 20 degrees of rotation around the second primary hinge axis. In this case, the timing sub-assembly 316 includes intermeshing primary timing gears 320 and secondary timing gears 322. In this case, the two primary gears are identical and the two secondary gears are identical and thus, meshing of the primary and secondary gears ensures simultaneous and equal rotation around the two primary hinge shafts 312. Other implementations may employ primary gears that directly intermesh without the secondary gears.

The friction sub-assembly 318 can be coupled to the primary hinge axes (e.g., the primary hinge shafts 312). The primary hinge shafts 312 can be fixed to the primary friction gears 332. In this example the primary hinge shafts 312 are keyed to the primary friction gears 332. This aspect can be seen in FIGS. 3D and 3E where the ends of the primary hinge shafts 312 are keyed with an external 'D' shape and the corresponding receptacle in the primary friction gears 332 is keyed with a corresponding 'D' shape. The primary friction gears 332 are meshed with secondary friction gears 334 that are positioned on secondary hinge shafts 328.

The secondary hinge shafts 328 can be rotationally received in the hinge guides 314. The friction sleeves 326 can be installed on an opposite end of the secondary hinge shafts 328 and retained by fasteners 338. The transmission element 330 can couple (e.g., transmit torques) between the secondary hinge shafts 328 and the primary hinge shafts 312. From one perspective, the transmission element 330 can be configured to transmit torque between the primary and secondary hinge shafts 312 and 328, respectively. In this case the transmission element 330 is manifest as the secondary friction gears 334 positioned on the secondary hinge shafts 328 and meshed with primary friction gears 332 positioned on the primary hinge shafts 312.

The friction sleeves 326 can define apertures 336 to have an inside diameter (measured transverse to the secondary hinge axes) that is slightly smaller than an outside diameter of the secondary hinge shafts 328 to cause a 'friction fit.' A slit 340 along the friction sleeve 326 can allow the friction sleeve 326 to be forced open slightly when the secondary hinge shafts 328 are inserted. The flexed state of the friction sleeve 326 can provide continuous force on the secondary hinge shafts 328 and hence create friction between the friction sleeve and the secondary hinge shaft. Further, friction can be increased as desired by lengthening the secondary hinge shafts 328 and the friction sleeves 326 in the x-reference direction.

This flexibility to increase the length of the secondary hinge shafts 328 and the friction sleeves 326 can allow desired friction to be obtained while selecting a relatively small diameter for the secondary hinge shafts 328 and an outside diameter of the friction sleeves 326 around the apertures 336. This relative thinness can benefit other device systems. For instance, this can allow the displays (128, FIG. 1) to extend over the friction sleeves 326 and thus cover a greater percentage of the device in the x-reference direction (smaller bezel width).

The friction fit of the secondary hinge shafts 328 in the friction sleeves 326 provides a resistance to rotation (e.g., the first and second portions will remain stationary unless an external force (torque) is applied to the first and second portions that overcomes the resistance). Note that the gearing of the primary and secondary friction gears 332 and 334 can be selected to customize the resistance to rotation provided by the friction sub-assembly 318. In the illustrated case, the primary friction gears 332 and the secondary friction gears 334 have the same pitch, but the secondary gears are smaller (e.g., fewer teeth around the circumference than the primary gears). This configuration of the meshing gears can transmit rotational motion and the smaller gear rotates faster and the larger gear rotates slower, but with proportionally greater torque. Other configurations are contemplated depending on the dimensions and design parameters of a particular device.

FIGS. 3A-3E collectively illustrate an example hinge assembly 106(2) where the primary and secondary hinge shafts 312 and 328 are parallel to one another, but offset from one another in both the x and y reference directions. FIGS. 4A-4D collectively illustrate another example where the primary and secondary hinge shafts 312 and 328 are parallel and adjacent to each other (e.g., spaced apart in the y reference direction, but not the x reference direction).

FIGS. 4A-4D collectively show another example hinge assembly 106(2)A. In this case, the communication member 304 operates cooperatively with a communication frame 402. The communication frame 402 defines a passage 404 that can allow a conductor 406 to pass through the hinge assembly 106(2)A from the first portion to the second portion. In this case, the timing sub-assembly's primary timing gear 320 and secondary timing gear 322 are positioned on the communication frame 402.

In this implementation, the transmission element 330 is positioned distally (e.g., toward the edges of the device along the hinge axes) relative to the timing sub-assembly 316. This can be contrasted with the example of FIGS. 3A-3G where the transmission element 330 is positioned proximally (e.g., toward the device center) relative to the timing sub-assembly 316.

In this case, the transmission element's primary friction gears 332 are defined by the communication member 304. The secondary friction gears 334 are positioned on the secondary hinge shafts 328. Intervening tertiary gears 410 complete the transmission element 330 by meshing with the primary friction gears 332 and the secondary friction gears 334.

The secondary hinge shafts 328 are received in, and rotate in, apertures 412 defined by the hinge housing 306. The opposite end of the secondary hinge shafts 328 are received in apertures 336 of friction sleeves 326. The friction sleeves 326 are secured to the hinge housing 306 by fasteners 414. The secondary hinge shafts 328 can be slightly oversized relative to apertures 336 to provide friction and hence resistance to rotation. The length of the friction sleeve 326 (as measured along the secondary hinge axis (SHA)) can be adjusted to adjust the friction.

In this example, the primary hinge shafts 312 pass through apertures 416 through primary friction gears 332 and are free to rotate in these apertures 416. The primary hinge shafts 312 are received in non-rotating relation (e.g., keyed) in apertures 418 and thus in non-rotating relation to primary timing gears 320. Accordingly, the primary hinge shafts 312 and the primary timing gears 320 rotate with the hinge housings 306.

In some device implementations, this hinge assembly 106(2)A can have a very small device footprint 420. The footprint 420 can be a portion of the hinge assembly that the displays do not extend over. In this case, the footprint 420 can include the communication member 304, primary friction gears 332 of the transmission element 330, and the primary timing gears 320 of the timing sub-assembly 316.

FIGS. 5A-5G collectively show another example hinge assembly 106(2)B. This hinge assembly is similar to hinge assembly 106(2)A, but adds a slit 502 in the communication member 304. The slit 502 extends from the aperture 416(1) to aperture 416(2) (e.g. connects the apertures). In other implementations, the slit may be manifest as a separate slit for each aperture rather than a single intersecting slit as illustrated. The slit 502 can allow the communication member to flex slightly if oversized primary hinge shafts 312 are inserted in the apertures 416. The flexed state of the communication member 304 can provide continuous force on the primary hinge shafts 312 and hence create friction between the communication member 304 and the primary hinge shafts 312. The flexing can allow the communication member 304 to apply a force to the primary hinge shafts 312 in a similar manner to slits 340 in the friction sleeves 326 described above relative to FIGS. 3A-3E. Thus, this particular implementation can provide friction around both the primary hinge shafts 312 and the secondary hinge shafts 328. This configuration can contribute to smooth functioning of the transmission element 330, such as by reducing the unwanted feeling of backlash (e.g., gear train slack experienced upon direction reversal due to gear tolerances). From one perspective, the friction fit of the communication member can provide some friction at instances when gear train slack reduces friction from the secondary hinge shafts.

Note that the transmission element 330 via primary friction gears 332, tertiary gears 410, and secondary friction gears 334 links the secondary hinge shafts 328 of the friction sub-assemblies 318 to the hinge assembly (e.g., to the communication member 304). The primary friction gears 332 are defined by the communication member 304 and do not rotate. The secondary friction gears 334 are fixed (e.g., do not rotate) on the secondary hinge shafts 328. The secondary hinge shafts 328 are also friction fit in apertures 336 of the friction sleeves 326. The friction sleeves 326 are secured to the first and second portions. In order for the first and second portions to be rotated relative to one another, the tertiary gears 410, and secondary friction gears 334 cause the secondary hinge shafts 328 to rotate around the primary friction gears 332. This will cause the secondary hinge shafts 328 to rotate within apertures 336. Recall that the friction fit between the secondary hinge shafts 328 and the friction sleeves 326 creates resistance to this rotation and rotation does not occur until the force on the first and second portions is sufficient to overcome this resistance and causes the secondary hinge shafts 328 to rotate within the friction sleeves 326.

Figure 6A:
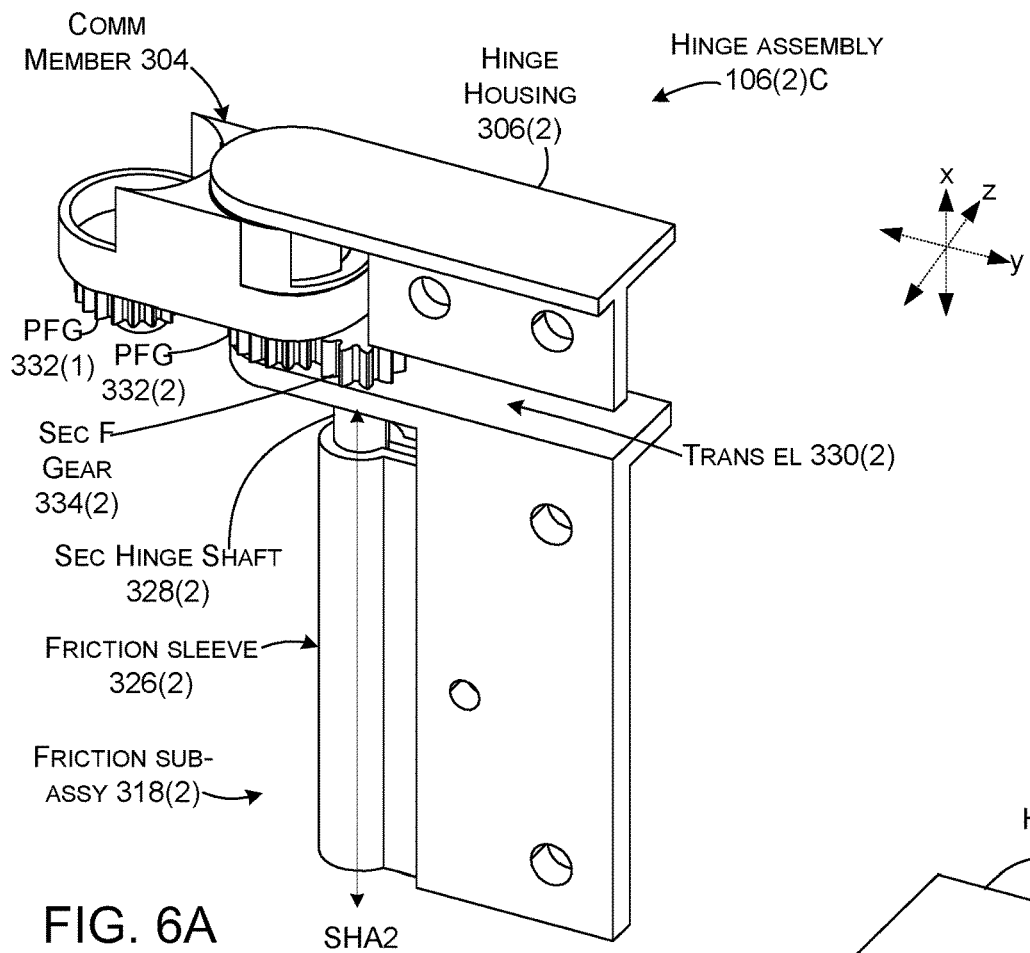
Figure 6B:
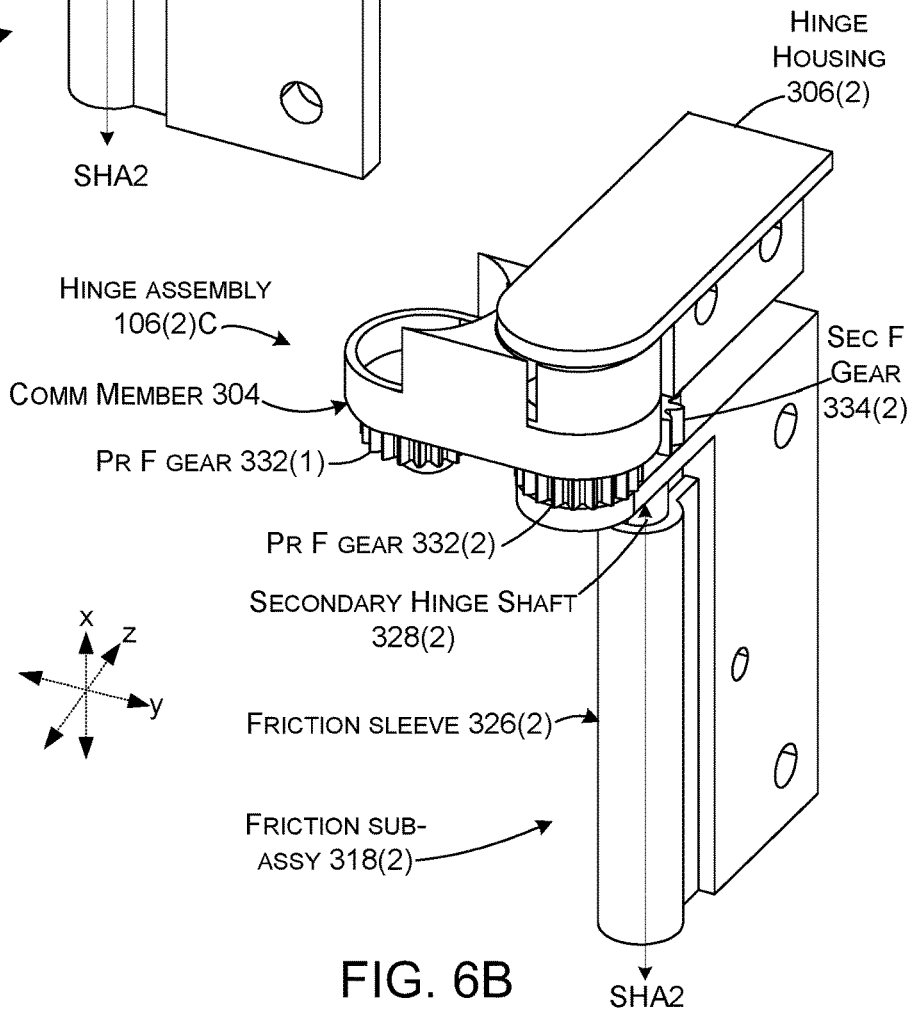
Figure 6C:
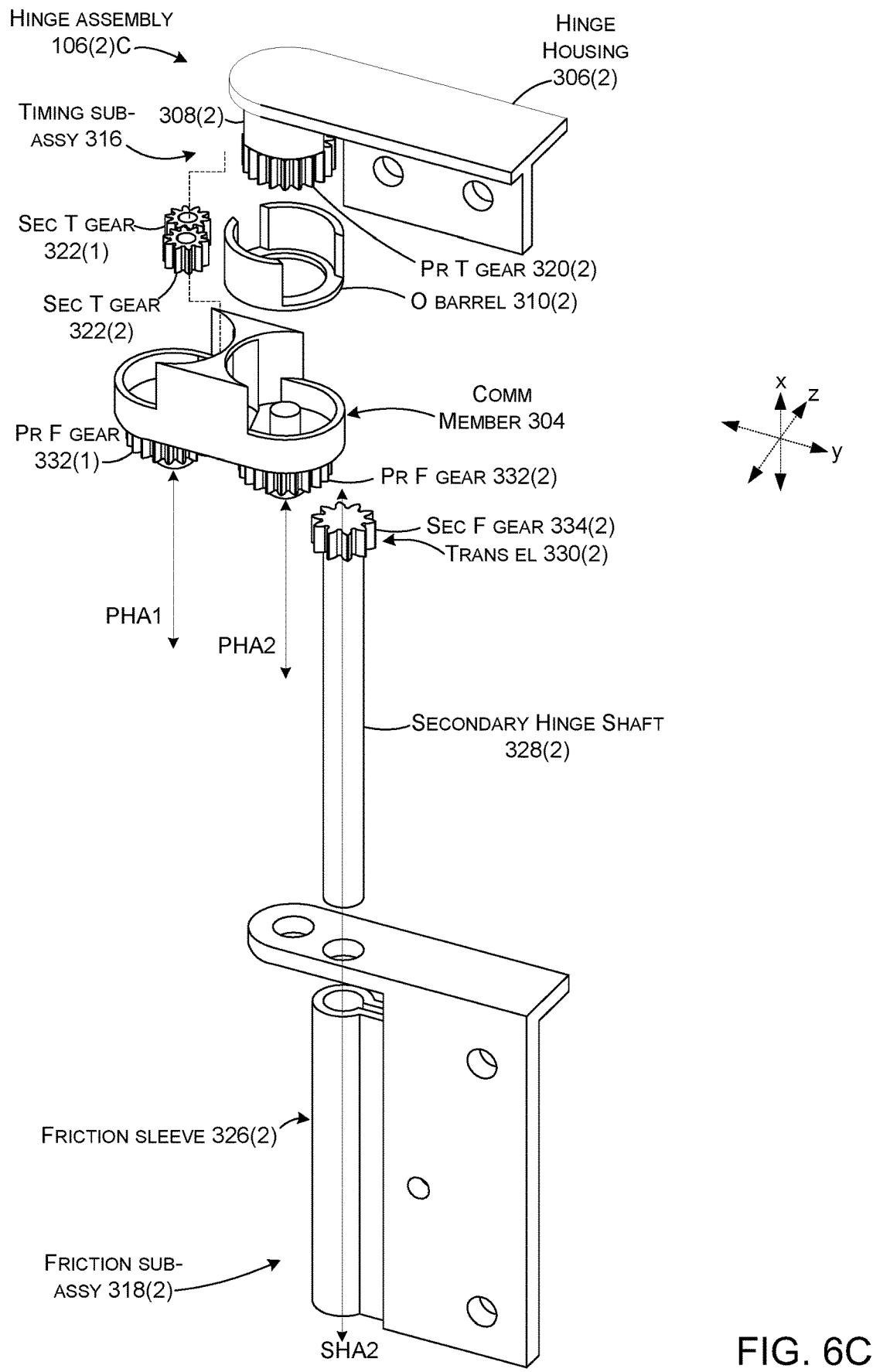
Figure 7A:
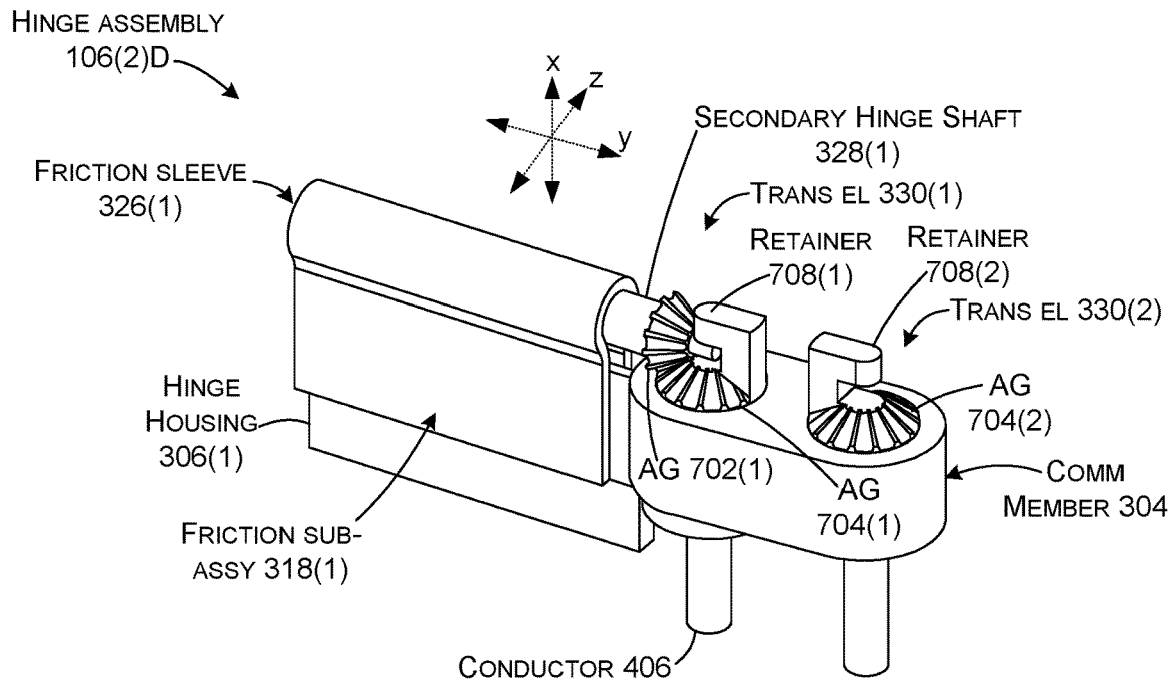
Figure 7B:
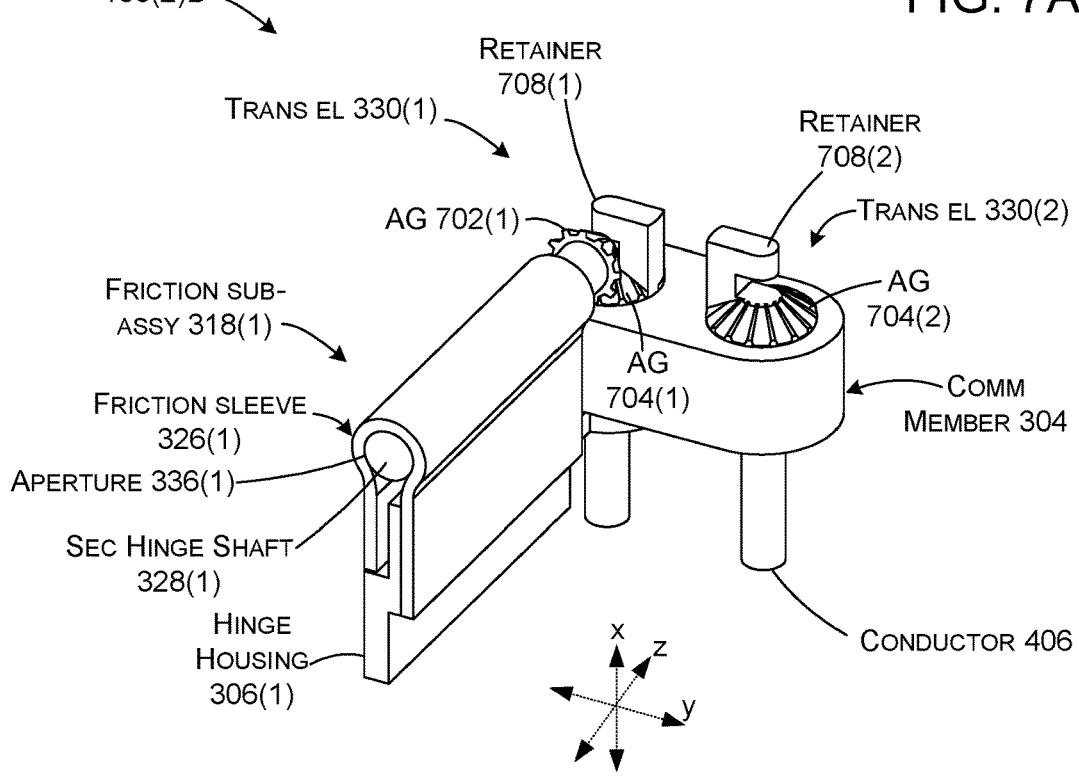
Figure 7C:
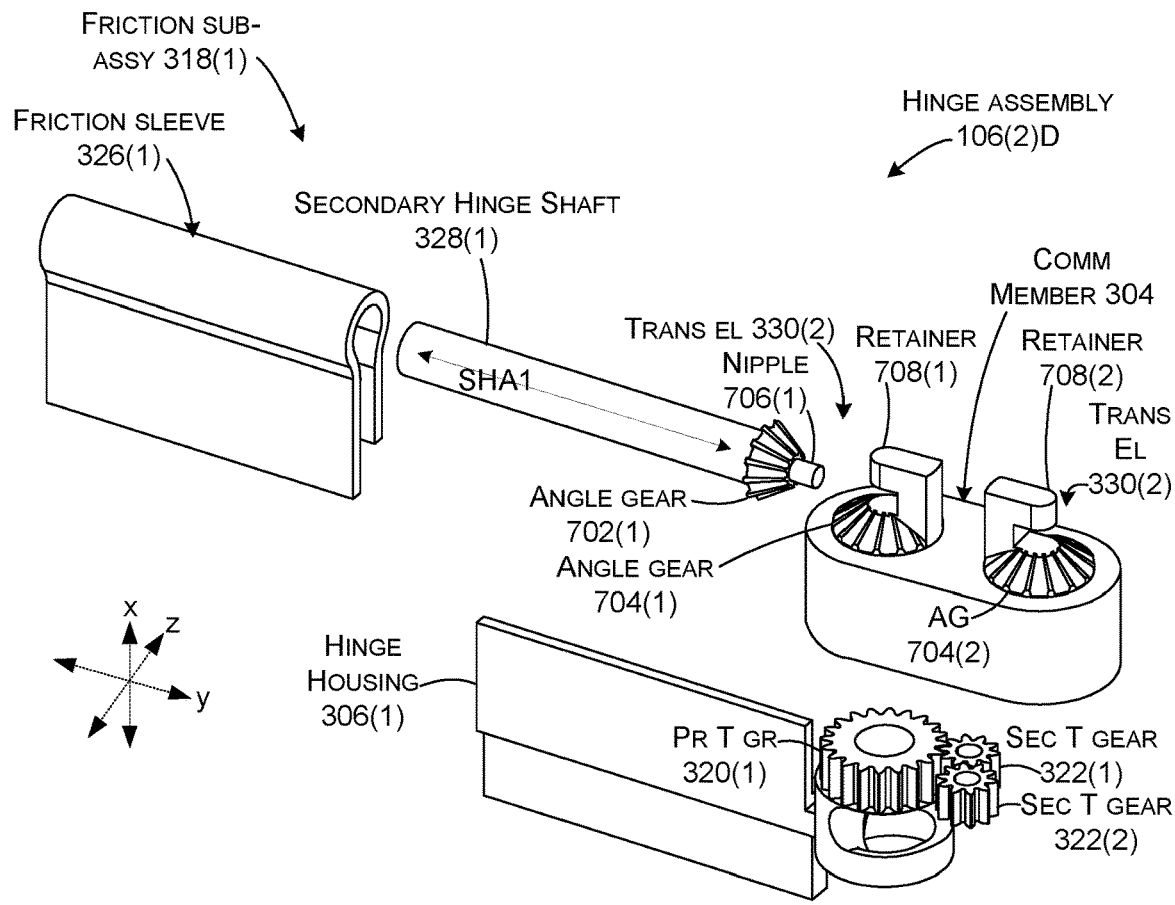
Figure 7D:
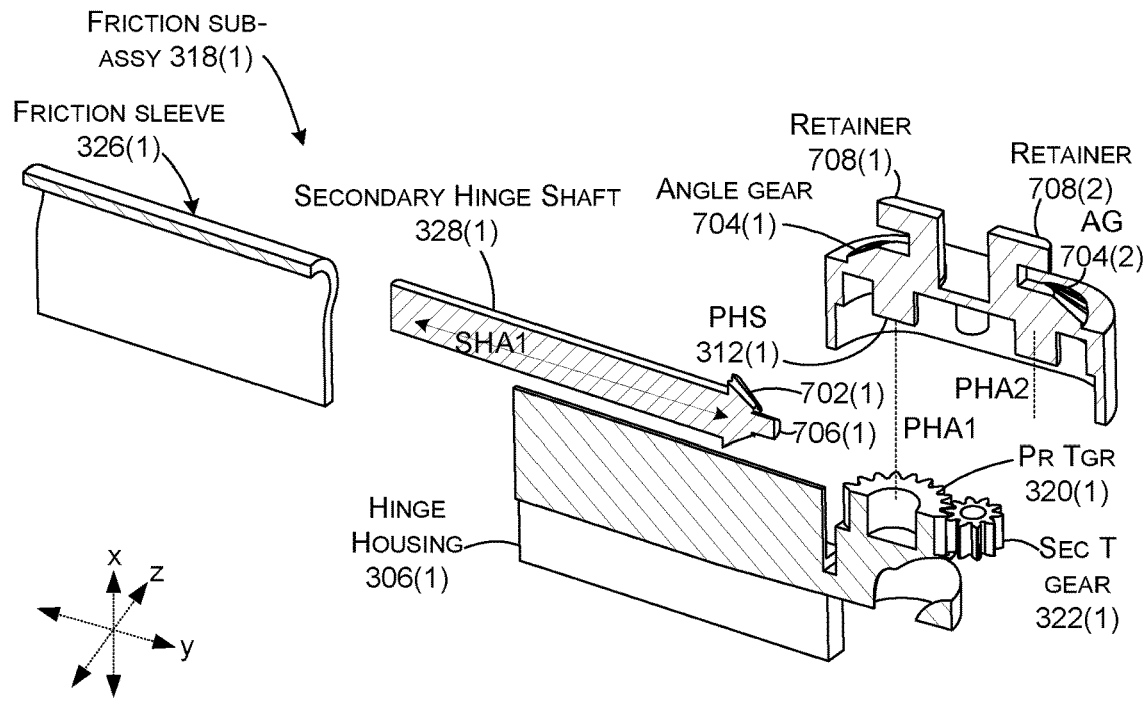
FIG. 7D shows a sectioned exploded perspective view of an example device in accordance with some implementations of the present concepts.

FIGS. 6A-6C collectively show another example hinge assembly 106(2)C. In this case, the inner barrels 308 are integrated into the hinge housings 306 and the outer barrels 310 fit in the communication member 304. The timing sub-assembly 316 functions similar to the description above with primary timing gears 320 interacting with secondary timing gears 322 to synchronize rotation of the two sides of hinge assembly 106(2)C (e.g., around the primary hinge shafts). In this case the primary timing gears 320 are integral with the hinge housings 306, which are secured to the first and second portions. The secondary timing gears 322 are positioned in the communication member 304.

The friction sub-assemblies 318 can include the secondary hinge shafts 328 and the friction sleeves 326. The secondary hinge shafts 328 are co-extensive with the secondary hinge axes. The secondary hinge shafts 328 are positioned in the friction sleeves 326 to generate friction (e.g., resistance to rotation) for the hinge assembly 106(2)C. The friction sleeves 326 can be secured to the first and second portions (e.g., first and second portion housings 216 of FIG. 2A). The primary friction gears 332 of the transmission elements 330 can be integral to the communication member 304. The secondary friction gears 334 can be integral with the secondary hinge shafts 328.

Note that the hinge housings 306 and the friction sleeves 326 are both secured to the first and second portions. The communication member 304 is captured between the hinge housings 306 and the friction sleeves 326. This configuration can hold the communication member more rigidly than other configurations, such as cantilevered configurations, and thus avoid torsional movement that could cause gear mis-alignment.

FIGS. 7A-7D collectively show another example hinge assembly 106(2)D. In this case, the secondary hinge shafts 328 of the friction sub-assemblies 318 are oriented perpendicular to the primary hinge shafts 312. The friction sleeves 326 are secured to the hinge housings 306. The friction sleeves define apertures 336. The secondary hinge shafts 328 are friction fit in the apertures 336. The transmission elements 330 couple the secondary hinge axes (e.g., the secondary hinge shafts 328) to the primary hinge axes (e.g., the primary hinge shafts 312).

Friction (e.g., resistance to rotation of the first and second portions) can be increased by increasing a length of contact between the friction sleeves 326 and the secondary hinge shafts 328. This can allow the frictions sleeves and secondary hinge shafts to be thin enough to be positioned under the display while still providing desired friction to the primary hinge shafts 312. Alternatively or additionally, the position of the frictions sleeves 326 and secondary hinge shafts 328 can be on the edge of the device in the existing bezel. As such, the elements responsible for providing rotational friction to the device are not determinative in defining the borders of the displays.

In this case, the transmission elements 330 entail angle gears 702 positioned on the secondary hinge axes (e.g., secondary hinge shafts 328) and angle gears 704 associated with primary hinge axes (e.g., primary hinge shafts 312). In this case, the angle gears 702 and 704 are right-angle gears that collectively define a right angle between the first hinge axes and the second hinge axes. Other angles are contemplated. For instance, one such example is shown and described relative to FIG. 10 where the angle gears define about an 80 degree angle.

The angle gears 702 and 704 can be manifest as several types of gears, such as straight bevel gears, spiral bevel gears, crown gears, or hypoid gears, among others. The intermeshing angle gears 702 and 704 may produce less backlash than other types of transmission elements. This backlash can be reduced further by biasing angle gears 702 toward angle gears 704. Two examples for accomplishing this biasing are discussed below relative to FIGS. 8 and 9.

In this example, the transmission elements 330 can also include nipples 706 on the secondary hinge shafts 328 that interact with retainers 708 positioned on the communication member 304. The combination of the friction sleeves 326, nipples 706, and retainers 708 can maintain the intermeshing relationship of the angle gears 702 and 704. The intermeshing angle gears 702 and 704 can function to transfer forces and movement between primary and secondary hinge shafts 312 and 328.

Figure 8:
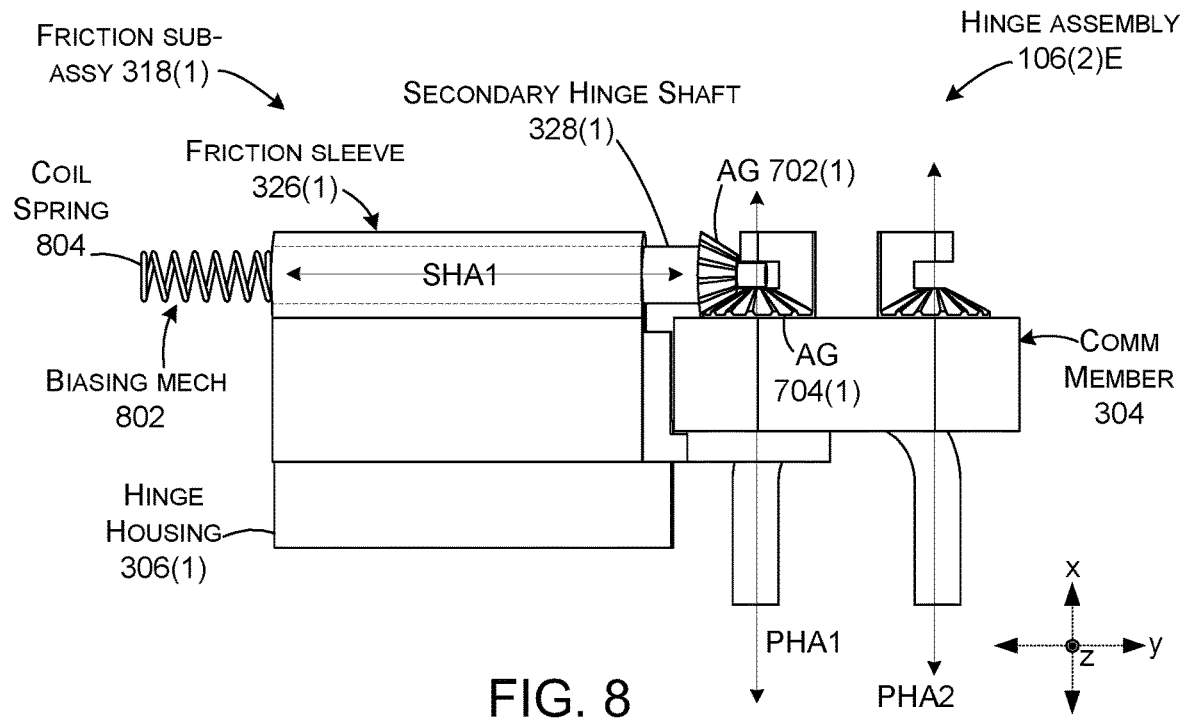

FIG. 8 shows another example hinge assembly 106(2)E that includes an example biasing mechanism 802 operating relative to the friction sub-assemblies 318. The biasing mechanism 802 can bias the secondary hinge shaft 328 toward the communication member 304 (e.g., toward angle gears 704). In this case, the biasing mechanism 802 is manifest as a coil spring 804 positioned between the first portion housing (126(1), FIG. 2A) and the end of the secondary hinge shaft 328. This biasing can reduce gaps between the intermeshing angle gears 702 and 704 and thereby reduce backlash from the transmission element 330. Reduced backlash can remove slack from the hinge assembly 106(2)E so that when the user moves the first and second portions to a specific orientation, the device stays at that orientation and doesn't tend to shift a few degrees one way or the other.

Figure 9:
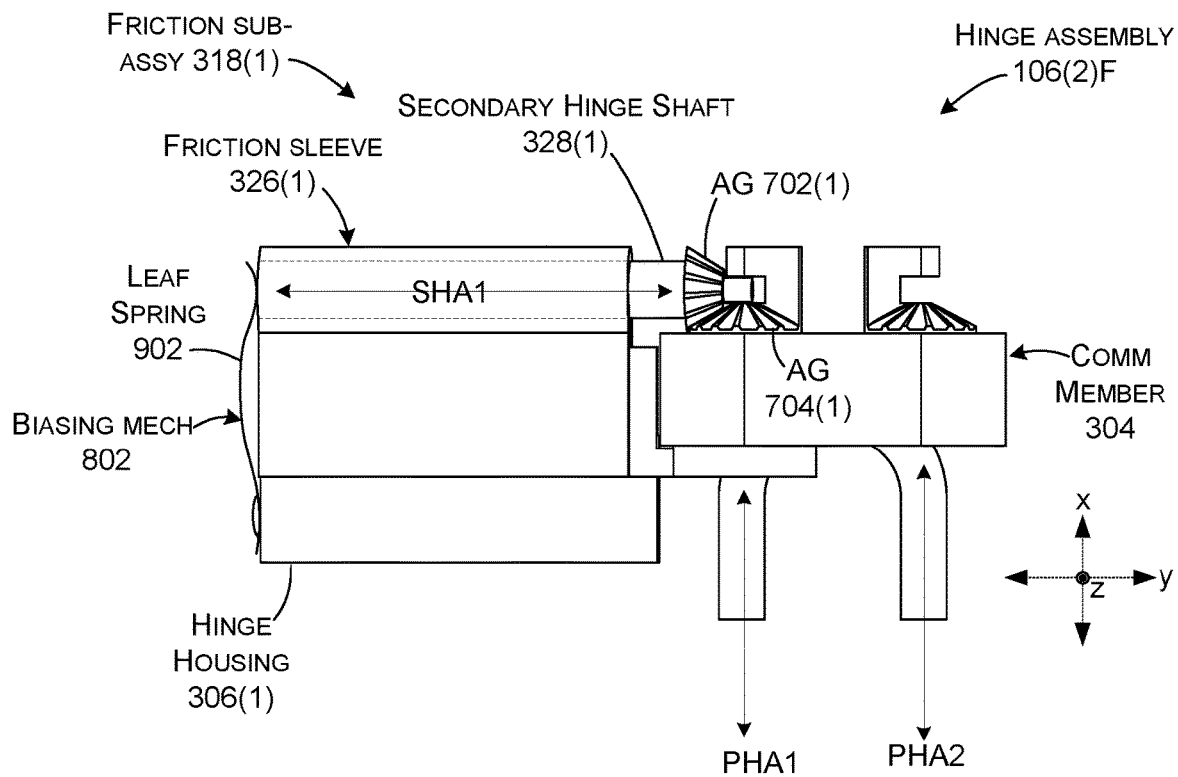

FIG. 9 shows another example hinge assembly 106(2)F that includes another example biasing mechanism 802 operating relative to the friction sub-assemblies 318. In this case, the biasing mechanism 802 is manifest as a leaf spring 902 that is secured to the hinge housing 306 and/or the friction sleeve 326. The leaf spring 902 can act on the end of the secondary hinge shaft 328 to bias the secondary hinge shaft 328 toward the communication member 304 and thereby bias the angle gear 702 toward angle gear 704 to reduce backlash. Other example biasing elements 802 are contemplated for accomplishing the described functionality.

Figure 10:
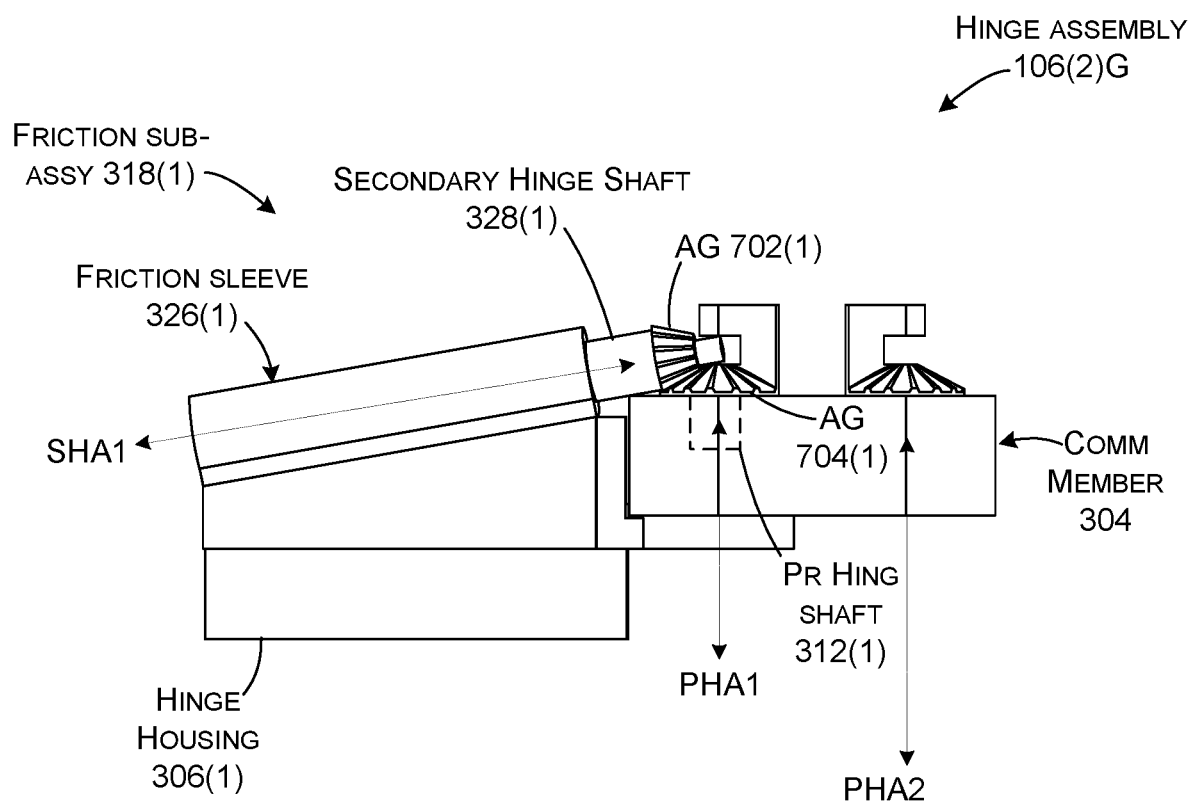

FIG. 10 shows another example hinge assembly 106(2)G. In this case, the secondary hinge axes (e.g., the secondary hinge shafts 328) are oriented neither parallel to, nor perpendicular to, the primary hinge axes (e.g., the primary hinge shafts 312 (shown in ghost to represent that they would be obscured in this view by the outside of the communication member 304)), but instead are oriented at an oblique angle. In this case, the oblique angle is about 80 degrees from the primary hinge shafts 312, but any oblique angle is contemplated. In this example, hinge assembly 106(2)F is similar to hinge assembly 106(2)C described above relative to FIGS. 7A-7D.

In this case the transmission elements 330 are manifest as angle gears 702 and 704 that function to transmit forces between primary hinge axes (e.g., primary hinge shafts 312) and secondary hinge axes (e.g., secondary hinge shafts 328). Friction sleeves 326 can be positioned in an area of the device where space is available. Further, friction can be increased by increasing the length of the contact between the friction sleeve 326 and the secondary hinge shafts 328 rather than increasing a thickness of the secondary hinge shafts. Accordingly, the friction sleeves and secondary hinge shafts can be thin enough to be positioned below the displays, or other dimensionally constrained regions of the device, if desired.

Individual elements of the hinge assemblies can be made from various materials, such as metals, plastics, and/or composites. These materials can be prepared in various ways, such as in the form of sheet metals, die cast metals, machined metals, 3D printed materials, molded or 3D printed plastics, and/or molded or 3D printed composites, among others, and/or any combination of these materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-10.

Various examples are described above. Additional examples are described below. One example includes a device comprising a first portion and a second portion that are rotatably secured by a hinge assembly, the hinge assembly defining a first primary hinge shaft associated with the first portion and a second primary hinge shaft associated with the second portion and a friction sub-assembly comprising a first secondary hinge shaft secured between the first portion and the first primary hinge shaft and a second secondary hinge shaft secured between the second portion and the second primary hinge shaft, the friction sub-assembly creating resistance to rotation of the first and second portions on the first and second secondary hinge shafts and transmitting that resistance to rotation to the first and second primary hinge shafts.

Another example can include any of the above and/or below examples where the first and second secondary hinge shafts are parallel to and offset from the first and second primary hinge shafts.

Another example can include any of the above and/or below examples where the first and second secondary hinge shafts are parallel to and adjacent to the first and second primary hinge shafts.

Another example can include any of the above and/or below examples where the friction sub-assembly further comprises a transmission element configured to accomplish the transmitting.

Another example can include any of the above and/or below examples where the transmission element comprises a gear train.

Another example can include any of the above and/or below examples where the device further comprises a timing sub-assembly configured to synchronize rotation of the first portion around the first primary hinge shaft to equal and simultaneous rotation of the second portion around the second primary hinge shaft.

Another example can include any of the above and/or below examples where the timing sub-assembly is positioned distally relative to the transmission element, or wherein the timing sub-assembly is positioned proximally relative to the transmission element.

Another example can include any of the above and/or below examples where the friction sub-assembly further comprises first and second friction sleeves that define first and second apertures, wherein the first friction sleeve is secured to the first portion and defines an aperture that is flexed to receive the first secondary hinge shaft in friction fit, and wherein the second friction sleeve is secured to the second portion and defines an aperture that is flexed to receive the second secondary hinge shaft in friction fit.

Another example can include any of the above and/or below examples where the device further comprises a first display positioned on the first portion over the first secondary hinge shaft and a second display positioned on the second portion over the second secondary hinge shaft.

Another example can include any of the above and/or below examples where a first display is positioned on the first portion over the first secondary hinge shaft and an accessory is positioned on the second portion over the second secondary hinge shaft.

Another example can include any of the above and/or below examples where the accessory is a keypad, game controller, trackpad or other input device.

Another example can include any of the above and/or below examples where a communication member defines the first primary hinge shaft and the second primary hinge shaft.

Another example can include any of the above and/or below examples where the device further comprises a communication member that receives the first primary hinge shaft and the second primary hinge shaft in friction fitting apertures.

Another example can include any of the above and/or below examples where the friction fitting apertures are connected by a slit.

Another example can include any of the above and/or below examples where the first and second secondary hinge shafts are not parallel to the first and second primary hinge shafts.

Another example can include any of the above and/or below examples where the first and second secondary hinge shafts are perpendicular to the first and second primary hinge shafts.

Another example includes a device comprising a first portion that is secured to a hinge assembly by a first primary hinge shaft and a first secondary hinge shaft that is parallel to but not co-extensive with the first primary hinge shaft and a second portion that is secured to the hinge assembly by a second primary hinge shaft and a second secondary hinge shaft that is parallel to but not co-extensive with the second primary hinge shaft.

Another example includes a device comprising first and second portions, a hinge assembly that defines a first primary hinge shaft around which the first portion rotates and a second primary hinge shaft around which the second portion rotates, a first secondary hinge shaft secured to the first portion and a second secondary hinge shaft secured to the second portion, a first transmission element that transmits torque between the first secondary hinge shaft and the first primary hinge shaft, and a second transmission element that transmits torque between the second secondary hinge shaft and the second primary hinge shaft.

Another example can include any of the above and/or below examples where the first and second secondary hinge shafts are parallel to the first and second primary hinge shafts.

Another example can include any of the above and/or below examples where the first and second secondary hinge shafts form oblique angles with the first and second primary hinge shafts.

Another example can include any of the above and/or below examples where the first and second secondary hinge shafts are perpendicular to the first and second primary hinge shafts.

Another example can include any of the above and/or below examples where the first and second transmission elements comprise angle gears.

Another example can include any of the above and/or below examples where the angle gears comprise bevel gears, crown gears, or hypoid gears.

Another example can include any of the above and/or below examples where the angle gears comprise right-angle gears.

Another example includes a device comprising a hinge assembly that defines a primary hinge axis around which first and second portions rotate, a friction sub-assembly configured to generate friction along a secondary hinge axis, and a first transmission element that transmits torque between the secondary hinge axis and the primary hinge axis.

Another example can include any of the above and/or below examples where the secondary hinge axis is parallel to the primary hinge axis.

Another example can include any of the above and/or below examples where the secondary hinge axis is perpendicular to the primary hinge axis.

Another example can include any of the above and/or below examples where the secondary hinge axis defines an oblique angle relative to the primary hinge axis.

Although techniques, methods, devices, systems, etc., pertaining to friction hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device, comprising:
   a first portion and a second portion that are rotatably secured by a hinge assembly, the first portion having a first display positioned thereon that is surrounded by a bezel and the second portion having a second display positioned thereon that is surrounded by the bezel, and the hinge assembly defining a first primary hinge shaft associated with the first portion that is positioned in the bezel and does not extend under the first display and defining a second primary hinge shaft associated with the second portion that is positioned in the bezel and does not extend under the second display; and, a friction sub-assembly comprising a first secondary hinge shaft that extends under the first display and is secured between the first portion and the first primary hinge shaft and a second secondary hinge shaft that extends under the second display and is secured between the second portion and the second primary hinge shaft, the friction sub-assembly creating resistance to rotation of the first and second portions on the first and second secondary hinge shafts and transmitting that resistance to rotation to the first and second primary hinge shafts.

2. The device of claim 1, further comprising primary and secondary friction gears that couple the first primary hinge shaft to the first secondary hinge shaft.

3. The device of claim 2, wherein the primary and secondary friction gears have equal pitches and different diameters.

4. The device of claim 1, wherein the friction sub-assembly further comprises a transmission element configured to accomplish the transmitting.

5. The device of claim 4, wherein the transmission element comprises a gear train.

6. The device of claim 4, further comprising a timing sub-assembly configured to synchronize rotation of the first portion around the first primary hinge shaft to equal and simultaneous rotation of the second portion around the second primary hinge shaft.

7. The device of claim 6, wherein the timing sub-assembly is positioned distally relative to the transmission element, or wherein the timing sub-assembly is positioned proximally relative to the transmission element.

8. The device of claim 1, wherein the friction sub-assembly further comprises a first friction sleeve secured to the first portion and that defines a first aperture that is configured to receive the first secondary hinge shaft and a second friction sleeve secured to the second portion and that defines a second aperture that is configured to receive the second secondary hinge shaft.

9. The device of claim 8, wherein the first aperture is flexed to receive the first secondary hinge shaft in friction fit, and wherein the second aperture is flexed to receive the second secondary hinge shaft in friction fit.

10. The device of claim 1, further comprising a communication member that defines the first primary hinge shaft and the second primary hinge shaft.

11. The device of claim 1, further comprising a communication member that receives the first primary hinge shaft and the second primary hinge shaft in friction fitting apertures.

12. The device of claim 11, wherein the friction fitting apertures are connected by a slit.

13. The device of claim 1, wherein the first and second secondary hinge shafts are not parallel to the first and second primary hinge shafts.

14. The device of claim 1, wherein the first and second secondary hinge shafts are perpendicular to the first and second primary hinge shafts.

15. A device, comprising:
first and second portions;
a hinge assembly that defines a first primary hinge shaft around which the first portion rotates and a second primary hinge shaft around which the second portion rotates;
a first secondary hinge shaft that is rotationally positioned in a first friction sleeve that is secured to the first portion and a second secondary hinge shaft that is rotationally positioned in a second friction sleeve that is secured to the second portion;
a first transmission element that transmits torque between the first secondary hinge shaft and the first primary hinge shaft;
a second transmission element that transmits torque between the second secondary hinge shaft and the second primary hinge shaft; and,
a conductor that passes from the first portion through the hinge assembly between the first secondary hinge shaft and the second secondary hinge shaft to the second portion.

16. The device of claim 15, wherein the first and second secondary hinge shafts are parallel to the first and second primary hinge shafts.

17. The device of claim 15, wherein the first and second secondary hinge shafts form oblique angles with the first and second primary hinge shafts.

18. A device, comprising:
a hinge assembly that defines a primary hinge axis around which first and second portions rotate and that includes a conductor extending across the primary hinge axis between the first and second portions;
a friction sub-assembly configured to generate friction along a secondary hinge axis that is not coextensive with the primary hinge axis utilizing a secondary hinge shaft that is positioned in a friction sleeve; and,
a first transmission element that transmits torque between the secondary hinge axis and the primary hinge axis.

* * * * *